(12) United States Patent
Danezis et al.

(10) Patent No.: US 8,667,292 B2
(45) Date of Patent: Mar. 4, 2014

(54) PRIVACY-PRESERVING METERING WITH LOW OVERHEAD

(75) Inventors: George Danezis, Cambridge (GB); Markulf Kohlweiss, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 90 days.

(21) Appl. No.: 13/111,695

(22) Filed: May 19, 2011

(65) Prior Publication Data

US 2012/0297198 A1  Nov. 22, 2012

(51) Int. Cl.
*H04L 29/06* (2006.01)

(52) U.S. Cl.
USPC ........... 713/179; 713/176; 713/171; 700/296; 700/291; 702/61; 726/26

(58) Field of Classification Search
USPC .................. 713/156, 176–179, 169–171; 705/34–40; 700/295, 94; 726/26; 702/61
See application file for complete search history.

(56) References Cited

U.S. PATENT DOCUMENTS

| 7,974,714 | B2 * | 7/2011 | Hoffberg ..................... 700/94 |
| 8,051,010 | B2 | 11/2011 | Camenisch et al. |
| 8,131,403 | B2 * | 3/2012 | Forbes et al. ................ 700/295 |
| 8,316,237 | B1 * | 11/2012 | Felsher et al. ............... 713/171 |
| 2007/0061594 | A1 | 3/2007 | Ginter et al. |
| 2010/0131329 | A1 | 5/2010 | An et al. |
| 2010/0138363 | A1 | 6/2010 | Batterberry et al. |
| 2010/0145534 | A1 | 6/2010 | Forbes, Jr. et al. |
| 2010/0211967 | A1 | 8/2010 | Ramaswamy et al. |
| 2011/0270453 | A1 * | 11/2011 | Kalogridis et al. .......... 700/291 |
| 2011/0271352 | A1 * | 11/2011 | Kalogridis et al. .......... 726/26 |
| 2012/0053472 | A1 * | 3/2012 | Tran ............................ 600/509 |
| 2012/0069997 | A1 * | 3/2012 | Kawabata et al. ........... 380/45 |
| 2012/0089494 | A1 * | 4/2012 | Danezis et al. .............. 705/34 |
| 2012/0131344 | A1 * | 5/2012 | Bellwood et al. ........... 713/176 |
| 2012/0137126 | A1 * | 5/2012 | Matsuoka et al. ........... 713/156 |
| 2012/0278014 | A1 * | 11/2012 | Davies ......................... 702/61 |

FOREIGN PATENT DOCUMENTS

WO  WO2010008289 A1  1/2010

OTHER PUBLICATIONS

J Kamto, "Key Distribution and management for Power aggregation", IEEE, vol. 11, pp. 360-365.*
Office action for U.S. Appl. No. 12/901,214, mailed on Feb. 15, 2012, Danezis et al., "Privacy-Preserving Metering", 12 pages.

(Continued)

*Primary Examiner* — Nathan Flynn
*Assistant Examiner* — Viral Lakhia
(74) *Attorney, Agent, or Firm* — Pablo Tapia; Micky Minhas; Zete Law, P.L.L.C.

(57) ABSTRACT

Privacy-preserving metering with low overhead is described. In an embodiment consumption of a resource such as electricity, car insurance, cloud computing resources is monitored by a meter and bills are created in a manner which preserves privacy of a customer but at the same reduces bandwidth use between a meter and a provider of the resource. For example, fine grained meter readings which describe customer behavior are kept confidential without needing to send large cryptographic commitments to meter readings from a meter to a provider. In an example, meter readings are encrypted and sent from a meter to a provider who is unable to decrypt the readings. In examples a cryptographic signature is generated to commitments to the meter readings and only the signature is sent to a provider thus reducing bandwidth. For example, a customer device is able to regenerate the commitments using the signature.

19 Claims, 9 Drawing Sheets

(56) References Cited

OTHER PUBLICATIONS

Anderson, et al., "On the security economics of electricity metering", retrieved on Aug. 23, 2010 at <<http://weis2010.econinfosec.org/papers/session5/weis2010_anderson_r.pdf>>, Workshop on Economics of Information Security, Jun. 2010, pp. 1-18.

Balasch, et al., "An Embedded Platform for Privacy-Friendly Road Charging Applications", retrieved on Aug. 23, 2010 at <<https://www.cosic.esat.kuleuven.be/publications/article-1330.pdf>>, IEEE, Design, Automation and Test in Europe, 2010, pp. 867-872.

Balasch, et al., "PrETP: Privacy-Preserving Electronic Toll Pricing", retrieved on Aug. 23, 2010 at <<http://www.usenix.org/event/sec10/tech/full_papers/Balasch.pdf>>, USENIX Security Symposium, 2010, pp. 1-16.

Bellare, et al., "On Defining Proofs of Knowledge", retrieved on Aug. 23, 2010 at <<http://citeseerx.ist.psu.edu/viewdoc/download?doi=10.1.1.55.6223&rep=rep1&type=pdf>>, Springer-Verlag, Lecture Notes in Computer Science vol. 740, Proceedings of Conference on Advances in Cryptology (CRYTPO), Aug. 1992, pp. 1-28.

Bellare, et al., "Random Oracles are Practical: A Paradigm for Designing Efficient Protocols", retrieved on Aug. 23, 2010 at <<http://caislab.kaist.ac.kr/lecture/2010/spring/cs548/basic/B11.pdf>>, ACM, Proceedings of Intl Conference on Computer and Communications Security, Fairfax, Virginia, 1993, pp. 62-73.

Bennett, et al., "A Security Standard for AMI Smart Meters", IEEE Energy 2030 Proceedings, EnerNex Corporation and Team for Research in Ubiquitous Secure Technologies, vol. 8, No. 17, Nov. 2008, pp. 1-8.

Bichsel, et al., "Cryptographic Protocols of the Identity Mixer Library", retrieved on Aug. 23, 2010 at <<http://www.zurich.ibm.com/~pbi/pub/rz3730.pdf>>, Computer Science, Mar. 2009, pp. 1-32.

Bohli, et al., "A Privacy Model for Smart Metering", retrieved on Aug. 23, 2010 at <<http://www.cs.uni-paderborn.de/uploads/tx_sibibtex/smart-metering-privacy-with-copyright.pdf>>, IEEE Intl Conference on Communications Workshops (ICC), Capetown, May 2010, pp. 1-5.

Boudot, "Efficient Proofs that a Committed Number Lies in an Interval", retrieved on Aug. 23, 2010 at <<http://citeseerx.ist.psu.edu/viewdoc/dowload?doi=10.1.1.103.4029&rep=rep1&type=pdf>>, Springer-Verlag Berlin, Lecture Notes in Computer Science, Proceedings of Intl Conference on Theory and Application of Cryptographic Techniques, Bruges, Belgium, 2000, pp. 431-444.

Camenisch, et al., "A Signature Scheme with Efficient Protocols", retrieved on Aug. 23, 2010 at <<http://sca2002.cs.brown.edu/research/pubs/pdfs/2002/Camenisch-2002-SSE.pdf>>, Springer-Verlag Berlin, Lecture Notes in Computer Science vol. 2576, 2003, pp. 268-289.

Camenisch, et al., "Proof Systems for General Statements about Discrete Logarithms", retrieved on Aug. 23, 2010 at <<http://citeseerx.ist.psu.edu/viewdoc/download?doi=10.1.1.56.1208&rep=rep1&type=pdf>>, ETH (Eidgenossische Technische Hochschule Zurich), Technical report 260, Mar. 1997, pp. 1-13.

Canetti, "Universally Composable Security: A New Paradigm for Cryptographic Protocols", retrieved on Aug. 23, 2010 at <<http://ieeexplore.ieee.org/stamp/stamp.jsp?tp=&arnumber=959888>>, IEEE Computer Society, Symposium on Foundations of Computer Science (FOCS), 2002, pp. 1-10.

Cavoukian, et al., "SmartPrivacy for the Smart Grid: Embedding Privacy into the Design of Electricity Conservation", retrieved on Aug. 23, 2010 at <<http://www.ipc.on.ca/images/Resources/pbd-smartpriv-smartgrid.pdf>>, The Future of Privacy Forum, Nov. 2009, pp. 1-27.

Chaum, et al., "Wallet Databases with Observers", retrieved on Aug. 23, 2010 at <<http://citeseerx.ist.psu.edu/viewdoc/download?doi=10.1.1.133.496&rep=rep1&type=pdf>>, Springer-Verlag, Lecture Notes in Computer Science vol. 740, Proceedigns of Advances in Cryptology (CRYPTO), 1993, pp. 89-105

Chung, et al., "An efficient and privacy-preserving authentication protocol for HAN", retrieved on Mar. 9, 2011 at <<http://caislab.kaist.ac.kr/publication/paper_files/2011/SCIS2011_Doyoung.pdf>>, The Institute of Electronics, Information and Communication Engineers Symposium on Cryptography and Information Security (SCIS), Kokura, Japan, Jan. 2011, pp. 1-7

Cramer, et al., "Proofs of Partial Knowledge and Simplified esign of Witness Hiding Protocols", retrieved on Aug. 23, 2010 at <<http://citeseerx.ist.psu.edu/viewdoc/download?doi=10.1.1.56.8038&rep=rep1&type=pdf>>, Springer-Verlag, Lecture Notes in Computer Science vol. 839, Proceedings of Advances in Cryptology (CRYPTO), 1994, pp. 174-187.

Cuijpers, "No to mandatory smart metering does not equal privacy!", retrieved on Oct. 14, 2010 at <<http://vortex.uvt.nl/TILTblog/?p=54 >>, Tilburg Institute for Law, Technolgy, and Society, WebLog (TILT), Apr. 17, 2009, pp. 1-3.

Danezis, "Privacy technology options for smart metering", A White Paper, Jan. 10, 2011, pp. 1-11.

Danezis, et al., "Privacy-friendly Smart Metering", retrieved on Jun. 13, 2011 at <<http://research.microsoft.com/en-us/projects/privacy_in_metering/>>, Jan. 10, 2011, pp. 1-2.

Danezis, "Privacy-friendly smart metering—Meter Modifications", retrieved on Mar. 9, 2011 at <<http://research.microsoft.com/en-us/projects/privacy_in_metering/privacymeter.pdf>>, Microsoft Corporation, Microsoft Research, Jan. 10, 2010, pp. 1-2.

de Jonge, et al., "Privacy-friendly Electronic Traffic Pricing via Commits", retrieved on Aug. 23, 2010 at <<http://www.dadamotive.com/ETPprivacyFAST2008lncs.pdf>>, Springer, Formal Aspects in Security and Trust, Lecture Notes in Computer Science, vol. 5491, 2009, pp. 143-161.

Fiat, et al., "How to Prove Yourself: Practical Solutions to Identification and Signature Problems", retrieved on Aug. 23, 2010 at <<http://citeseerx.ist.psu.edu/viewdoc/download?doi=10.1.1.13.8796&rep=rep1&type=pdf>>, Springer-Verlag, Lecture Notes in Computer Science vol. 263, Proceedings of Advances in Cryptology (CRYPTO), 1987, pp. 186-194.

Garcia, et al., "Privacy-friendly Engergy-metering via Homomorphic Encryption", retrieved on Mar. 9, 2011 at <<http://www.cs.ru.nl/~flaviog/publications/no-leakage.pdf>>, Workshop on Security and Trust Management (STM), 2010, pp. 1-14.

Garcia, et al., "Privacy-friendly Energy-metering via Homomorphic Encryption", retrieved on Aug. 23, 2010 at <<http://www.cs.ru.nl/~flaviog/publications/no-leakage.pdf>>, Springer Verlag, Lecture Notes in Computer Science, Workshop on Security and Trust Management (STM), Feb. 2010, pp. 1-14.

Goldwasser, et al., "A Digital Signature Scheme Secure Against Adaptive Chosen-Message Attacks", retrieved on Aug. 23, 2010 at <<http://citeseerx.ist.psu.edu/viewdoc/download;jsessionid=14689A44EA262C059D089AB89B6F8E9B?doi=10.1.1.89.1320&rep=rep1&type=pdf>>, Society for Industrial and Applied Mathematics (SIAM), Journal on Computing, vol. 17, No. 2, Apr. 1988, pp. 281-308.

Groth, "Non-interactive zero-knowledge Arguments for Voting", retrieved on Aug. 23, 2010 at <<http://citeseerx.ist.psu.edu/viewdoc/download?doi=10.1.1.69.1132&rep=rep1&type=pdf>>, Springer-Verlag, Lecture Notes in Computer Science vol. 3531, Applied Crytpography and Network Security, 2005, pp. 467-482.

Hart, "Nonintrusive Appliance Load Monitoring", retrieved on Aug. 23, 2010 at <<http://ieeexplore.ieee.org/stamp/stamp.jsp?tp=&arnumber=192069>>, Proceedings of the IEEE, vol. 80, No. 12, Dec. 1992, pp. 1870-1891.

Jawurek, et al., "Plug-in privacy for Smart Metering billing", retrieved on Mar. 9, 2011 at <<http://arxiv.org/PS_cache/arxiv/pdf/1012/1012.2248v2.pdf>>, CORR, 2010, pp. 1-17.

Kang, et al., "A Model for Privacy Preserving Metering Service", retrieved on Mar. 9, 2011 at <<http://ieeexplore.ieee.org/stamp/stamp.jsp?tp=&arnumber=4588109>>, Digest of Technical Papers, Intl Conference on Consumer Electronics (ICCE), Las Vegas, Nevada, Jan. 2008, pp. 1-2.

Keemink, et al., "Security analysis of Dutch smart metering systems", retrieved on Aug. 23, 2010 at <<http://staff.science.uva.nl/~delaat/sne-2007-2008/p33/report.pdf>>, Jul. 7, 2008, pp. 1-56.

(56) References Cited

OTHER PUBLICATIONS

Laughman, et al., "Power Signature Analysis", retrieved on Aug. 23, 2010 at <<http://ieeexplore.ieee.org/stamp/stamp.jsp?tp=&arnumber=1192027>>, IEEE Power and Energy magazine, Mar./Apr. 2003, pp. 56-63.

Lee, et al., "Smart Grid Cyber Security Strategy and Requirements", retrieved on Aug. 23, 2010 at <<http://www.naseo.org/eaguidelines/documents/cybersecurity/Nistlr-7628%20smart%20grid.pdf>>, National Institute of Standards and Technology, Sep. 2009, pp. 1-236.

Lisovich, et al., "Privacy Concerns in Upcoming Residential and Commercial Demand-Response Systems", retrieved on Aug. 23, 2010 at <<http://wislsrv.ece.cornell.edu/~mikhail/Copy%20of%20Source%20Material/lisovich2007pci_v3.pdf>>, IEEE Proceedings on Power Systems, vol. 1, No. 1, Mar. 2008, pp. 1-10.

McDaniel, et al., "Security and Privacy Challenges in the Smart Grid", retrieved on Aug. 23, 2010 at <<http://ieeexplore.ieee.org/stamp/stamp.jsp?tp=&arnumber=5054916>>, IEEE Computer Society and IEEE Reliability Society, May/Jun. 2009, pp. 75-77.

McLaughlin, et al., "Energy Theft in the Advanced Metering Infrastructure", retrieved on Aug. 23, 2010 at <<http://www.patrickmcdaniel.org/pubs/critis09.pdf>>, USENIX Security Symposium, Washington, DC, Aug. 2010, pp. 1-12.

Mohsenian-Rad, et al., "Optimal and Autonomous Incentive-based Energy Consumption Scheduling Algorithm for Smart Grid", retrieved on Aug. 23, 2010 at <<http://www.ece.ubc.ca/~vincentw/C/MRWJScSG10.pdf>>, IEEE PES Conference on Innovative Smart Grid Technologies, Jan. 2010, pp. 1-6.

Okamoto, "An Efficient Divisible Electronic Cash Scheme", retrieved on Aug. 23, 2010 at <<http://web.archive.org/web/20030726203747/http://dsns.csie.nctu.edu.tw/research/crypto/HTML/PDF/C95/438.PDF>>, Springer-Verlag London, Lecture Notes in Computer Science vol. 963, Proceedings of Intl Cryptology Conference on Advances in Cryptology, 1995, pp. 438-451.

Quinn, "Privacy and the new energy infrastructure", retrieved on Aug. 23, 2010 at <<http://townsend.asia/Templates/media/files/media%20coverage/Elias%20Quinn%20-%20SmartGridPriv.pdf>>, Social Science Research Network (SSN), Feb. 2009, pp. 1-42.

Rabin, et al., "Randomized Algorithms in Number Theory", John Wiley and Sons, Communications on Pure and Applied Mathematics, vol. XXXIX, 1986, pp. S239-S256.

Rial, et al., "Privacy-Preserving Smart Metering", retrieved on Mar. 9, 2011 at <<http://research.microsoft.com/en-us/um/people/gdane/pfsm.pdf.pdf>>, Technical Report MSR-TR-2010-150, Microsoft Corporation, Microsoft Research, Nov. 2010, pp. 1-21.

Rial, et al., "Universally Composable Adaptive Priced Oblivious Transfer", retrieved on Aug. 23, 2010 at <<https://www.cosic.esat.kuleuven.be/publications/article-1236.pdf>>, Springer-Verlag Berlin, Lecture Notes in Computer Science, Proceedings of Intl Conference on Pairing-Based Cryptography, Palo Alto, California, 2009, pp. 231-247.

Schnorr, "Efficient Signature Generation for Smart Cards", retrieved on Aug. 23, 2010 at <<http://caislab.kaist.ac.kr/lecture/2010/spring/cs548/basic/B06.pdf>>, Springer-Verlag, Journal of Cryptology, vol. 4, No. 3, 1991, pp. 161-174.

Troncoso, et al., "PriPAYD: Privacy Friendly Pay-As-You-Drive Insurance", retrieved on Aug. 23, 2010 at <<http://citeseerx.ist.psu.edu/viewdoc/download?doi=10.1.1.119.5539&rep=rep1&type=pdf>>, ACM, Proceedings of Workshop on Privacy in the Electronic Society, Alexandria, Virginia, 2007, pp. 99-107.

Wagner, et al., "Linked Data for a privacy-aware Smart Grid", retrieved on Aug. 23, 2010 at <<http://sites.google.com/site/andreasjosefwagner/LinkedDataforaprivacy-awareSmartGrid_5.pdf?attredirects=0&d=1>>, INFORMATIK, 2010, pp. 1-6.

* cited by examiner

PRIVACY-PRESERVING METERING WITH LOW OVERHEAD

BACKGROUND

Metering is involved in many application domains such as electricity metering, water metering, gas metering, pay as you drive car insurance, traffic congestion charging, on-line services metering such as pay-per-view digital rights management, software as a service metering and others. However, as the sophistication of the metering increases there are concerns about user privacy protection. For example, it may be possible, through fine grain electricity meter readings, to identify which electrical appliances are used through load monitoring. Detailed consumption data may facilitate the creation of users' lifestyle profiles, with information such as when they are at home, when they eat, whether they arrive late to work and so on. User privacy concerns arise where there is metering in other application domains. For example, pay-as-you drive car insurance, tolling or taxation based on the time, distance and location of a vehicle may potentially make that fine grained information available to providers.

Existing approaches for protecting user privacy where metering is carried out are typically administrative, for example, being based on codes of conduct, regulations and legislation.

Other solutions for protecting users' privacy have involved enabling groups of users living in the same neighborhood to compute the sum of their consumption without disclosing their individual consumption. However this type of approach is complex and relies on collaboration between users in the group. The embodiments described below are not limited to implementations which solve any or all of the disadvantages of known privacy-preserving metering systems.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present a selection of concepts disclosed herein in a simplified form as a prelude to the more detailed description that is presented later.

Privacy-preserving metering with low overhead is described. In an embodiment consumption of a resource such as electricity, car insurance, cloud computing resources is monitored by a meter and bills are created in a manner which preserves privacy of a customer but at the same reduces bandwidth use between a meter and a provider of the resource. For example, fine grained meter readings which describe customer behavior are kept confidential without needing to send large cryptographic commitments to meter readings from a meter to a provider. In an example, meter readings are encrypted and sent from a meter to a provider who is unable to decrypt the readings. In examples a cryptographic signature is generated to commitments to the meter readings and only the signature is sent to a provider thus reducing bandwidth. For example, a customer device is able to regenerate the commitments using the signature.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a metering system for utilities, the system described is provided as an example and not a limitation. As those skilled in the art will appreciate, the present examples are suitable for application in a variety of different types of privacy-preserving metering systems.

Figure 1:
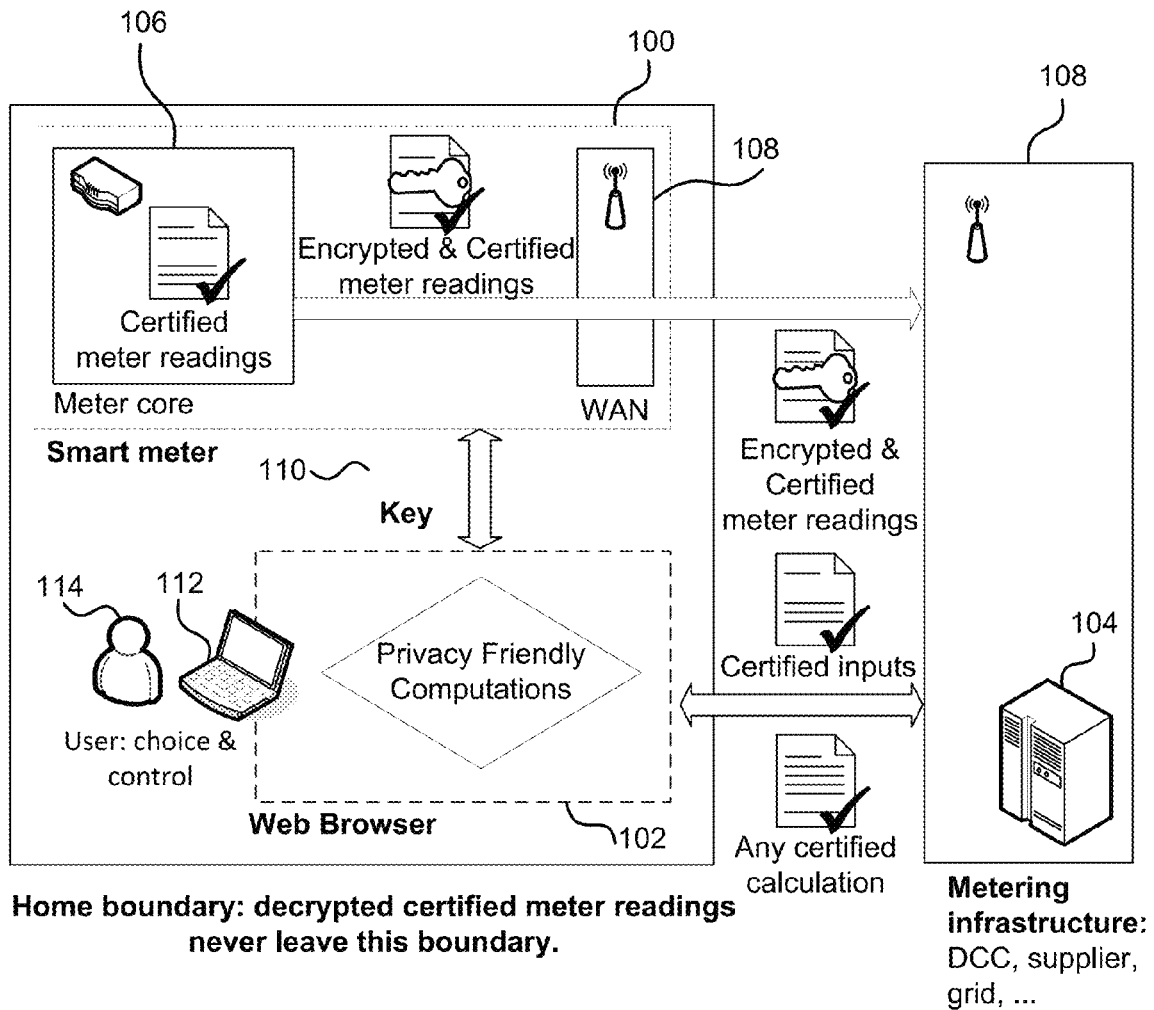
FIG. 1 is a schematic diagram of a privacy-preserving metering system.

FIG. 1 is a schematic diagram of a privacy-preserving metering system for utilities metering. A smart meter 100 located at a customer's home has a meter core 106 which monitors use of the utility (such as electricity, gas, water, or other resource) by the customer. The term "smart meter" is used herein to refer to equipment which monitors consumption of a resource by a customer in a manner which provides detailed consumption data which, if disclosed, would reveal data about customer behavior which a customer may prefer to keep confidential. The resource may be of any type such as electricity, gas, water, time, physical location or other resource. For example, in a pay-as-you-go motor insurance application the resource may be time and location (or distance).

The meter core 106 produces certified meter readings which are encrypted by the smart meter, either at the meter core 106 or outside that core, using a customer key 110. The customer key is shared by the smart meter 100 and a customer 114 as well as a web browser 102 used by the customer 114 at a computing device 112. By sharing the customer key in this way the customer is able to access the detailed meter readings. Because the customer key is not available to other entities the encrypted meter readings cannot be decrypted by others. This ensures the privacy of the meter readings. The customer key may be generated by the meter and shared with the customer.

The computing device 112 may be at the customer's home together with the smart meter so that decrypted certified meter readings never leave a home boundary being a geographical boundary of a customer's home. The smart meter 100 and the computing device 112 may be integral although this is not essential.

The smart meter 100 comprises a communications interface 108 which enables the smart meter to communicate with other entities over a wide area network or other type of communications network. The smart meter 100 is able to communicate with metering infrastructure 104 of a provider of the utility over the wide area network in the example shown in FIG. 1. The metering infrastructure may comprise one or more computing devices.

The smart meter 100 is arranged to send the encrypted and certified meter readings over the wide area network 108 to the metering infrastructure 104. However, the metering infrastructure 104 of the provider is not able to read the detailed meter readings because they are encrypted. The bandwidth required to send the encrypted and certified meter readings over the wide area network to the metering infrastructure is about the same as that used where meter readings are not encrypted or certified.

The smart meter 100 also sends cryptographic signatures to the metering infrastructure 104 of the provider. These cryptographic signatures do not reveal the meter readings to the provider and cannot be used by the provider to decrypt the encrypted meter readings. They are used by the provider in a verification process described in more detail below which enables the provider to check that a bill for consumption of the resource by the customer is correct. The bandwidth required to send the cryptographic signatures is low as described in more detail below. The cryptographic signatures are generated by generating commitments to the individual meter readings as an intermediate step. The commitments are generated using a pseudo random string derived from the customer key. A commitment to a meter reading is a hidden meter reading that a sender (such as the meter) may hide using cryptographic techniques and send to a receiver (such as the provider). Because the meter reading is hidden the receiver is unable to find out the meter reading value itself. Because the sender has sent a commitment to the meter reading, the sender is unable to cheat by later saying that the meter reading is a higher or lower value than that originally sent. The sender is able to send an opening to the commitment to the receiver which the receiver may use to reveal the meter reading from the commitment. Sending the commitments to the individual meter readings from the meter to the provider involves using significant amounts of communications bandwidth. To reduce the amount of bandwidth required, the meter batches groups of commitments to meter readings and generates a cryptographic signature for each batch. Those signatures are then sent to the provider. The individual commitments to readings are never sent from the meter and may be discarded by the meter after the signatures are generated.

The smart meter optionally sends additional information to the provider such as information about the health of a network used to provide the resource to the customer. The smart meter may obtain this information by monitoring the network external to the customer's home boundary as well as monitoring the consumption of the resource internal to the customer's home boundary. This information may not be encrypted.

The customer 114 is able to operate a computing device 112 which has a web browser 102 to access a web service provided by the metering infrastructure 104 or any other entity. The computing device 112 may be a smart phone, personal digital assistant, laptop computer, personal computer, or any computing device which is able to provide a web browser and make privacy friendly computations using the meter readings. The web browser 102 knows the customer key since that key is shared by the customer and the smart meter. The web browser 102 is able to download the certified, encrypted meter readings from the provider and to decrypt those using the customer key. The web browser optionally verifies that the readings were genuinely emitted by the appropriate smart meter. The web browser is able to obtain appropriate tariffs from the provider or any other entity in the wide area network. It is arranged to compute a resource consumption computation such as a bill (or other computation) using the decrypted meter readings and computation information such as tariffs. The bill (or other result) does not contain any of the fine grained meter readings. For example, the resource consumption computation may be a summary of the customer's resource consumption behavior which does not contain any fine grained meter readings. For example, it gives aggregated consumption values which do not prejudice privacy of the customer. The web browser may also compute statistics or other data about the customer's behavior from the decrypted meter readings and display those to the user with suggestions about how to reduce resource consumption and/or future bills. These statistics and suggestions are only available to the customer and so privacy is protected.

The web browser 102 is arranged to re-generate the commitments to the meter readings that were generated by the smart meter. It has access to the customer key which was used by the smart meter for generating the commitments. The web browser also downloads the signatures of the batches of commitments from the provider. It uses the regenerated commitments and the downloaded signatures to generate a proof of correctness of the bill. The web browser 102 is able to send the bill, the proof of correctness of the bill and the regenerated commitments to the provider. This information does not enable the provider to breach the customer's privacy. For example, the proof of correctness of the bill may be a zero-knowledge proof as described in more detail below.

The provider verifies the bill. For example, it checks that the bill and proof were calculated using the correct commitments and tariffs and the correct algorithm for computing the bill. It also checks that the cryptographic signatures it received from the meter agree with the regenerated commitments received from the web browser. In this way the provider is assured that the bill is correct without having any access to the meter readings in unencrypted form.

Figure 2:
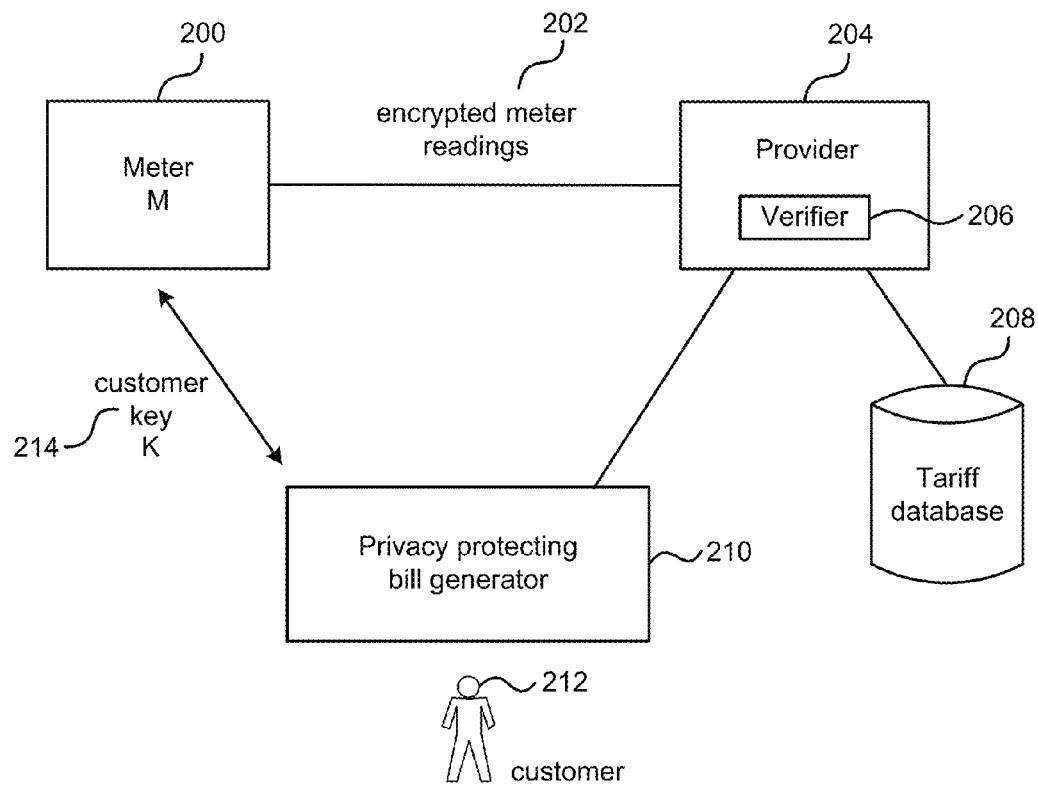
FIG. 2 is a schematic diagram of another privacy-preserving metering system.

FIG. 2 is a schematic diagram of a privacy-preserving metering system for metering in general. For example, the resource being metered may be electricity, water, gas, pay as you drive vehicle insurance, traffic congestion charging, on-line services metering, pay-per-view digital rights management, software as a service metering, cloud computing resources, server farm resources, and others. The resource is metered by meter M 200 which sends encrypted meter readings 202 to a provider 204 being a computing entity which stores the encrypted meter readings and comprises a verifier 206 and access to a tariff database 208. The meter 200 also generates cryptographic secrets about the meter readings but which do not reveal the meter readings. Those cryptographic secrets are sent to the provider 204 in a form which requires little communications capacity or bandwidth. For example, as cryptographic signatures of batches of commitments to individual meter readings.

The verifier 206 is computer implemented and is arranged to verify bills and proofs of those bills. The provider has access to a store of tariffs 208 or pricing information for consumption of the resource. The store may be integral with the provider or may be at another location accessible to the provider 204 over a communications network.

The meter 200 and a privacy protecting bill generator 210 share knowledge of a customer key K 214 which is secret to other entities. The privacy protecting bill generator 210 is associated with a customer 212 and may be provided using software at a computing device such as a smart phone, personal computer, laptop computer or other computing device. The privacy protecting bill generator is able to access the encrypted meter readings 202 from the provider 204 and to decrypt those using the customer key K 214. It accesses appropriate tariff information and computes a bill which gives aggregated consumption data so as not to reveal detail about the customer's resource consumption behavior. The privacy protecting bill generator also accesses the signatures of the batches of commitments from the provider. It uses those to generate a proof that the bill is correct and regenerates the commitments to the meter readings generated by the meter 200. The bill, proof and regenerated commitments are sent to the verifier 206. The verifier is then able to check that the bill is correct without having any access to detailed consumption data.

Figure 3:
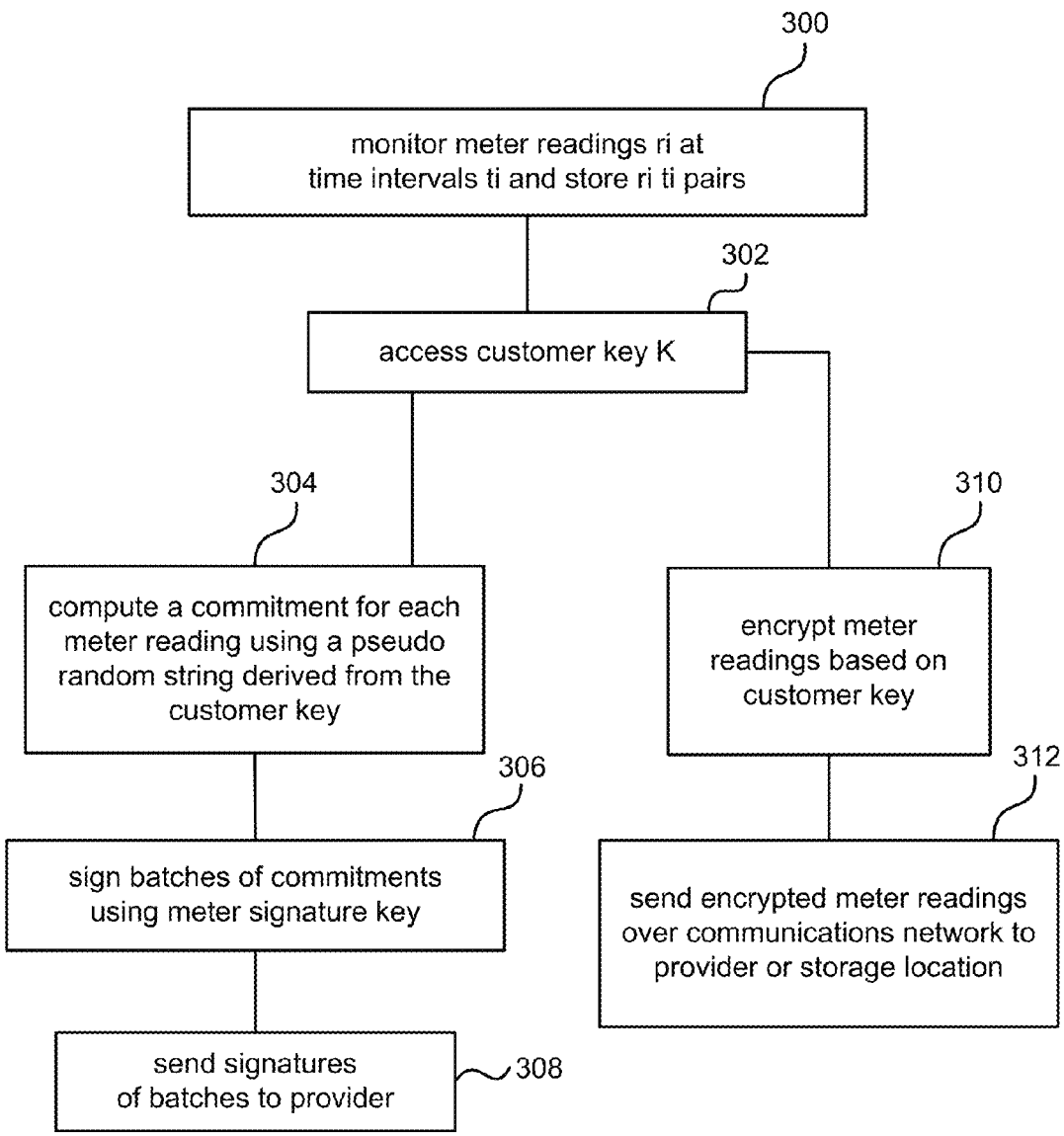
FIG. 3 is a flow diagram of a method at a meter.

FIG. 3 is a flow diagram of a method at a meter such as the meter 100 of FIG. 1 or the meter 200 of FIG. 2. Meter readings ri are monitored 300 at time intervals ti and stored as ri, ti pairs. For example, the time intervals may be fixed time intervals and this time interval may be public domain information. Where the time interval is fixed and public domain, computations are reduced as the meter is able to encrypt the ri values but not the ti values. However, it is not essential to use a fixed public domain time interval. In that case, the ri, ti pairs are encrypted to keep the information about the time intervals (which may be irregular) private.

The meter accesses 302 a customer key K. For example, the customer key K may be a string of letters and/or digits which is unique to the customer. The customer may obtain the customer key from a label on the meter, from a display screen at the meter, from documentation of the meter, or in other ways. In another example, the customer key is known to the customer and input to the meter by the customer. The customer key then stays with the customer should the customer move house in the case of utility metering where the meter remains in the house. The customer key K is shared by the meter and the customer but is secret to other entities and is difficult to guess.

The meter encrypts 310 the meter readings based on the customer key. In some examples the customer key is used to derive temporary keys which are used to encrypt individual readings. This is described in more detail below. However, it is not essential to derive temporary keys from the customer key. The customer key K may be used to encrypt all the meter readings.

The encrypted meter readings are sent 312 over a communications network to a provider or storage location accessible by the provider. Because the meter readings are encrypted and the provider is unable to decrypt the readings the privacy of the customer is ensured. The communications capacity to send the encrypted meter readings is similar to that for traditional, unencrypted meter readings. A separate digital signature over the encrypted readings may be provided by the meter. The provider may use this separate digital signature to check the correctness of the encrypted readings.

The meter also computes cryptographic secrets used to compute commitments to the meter readings. These commitments are never sent to the provider by the meter. Thus no additional communications capacity to send the cryptographic secrets is required. For example, the meter computes 304 a commitment for each meter reading using a pseudo random string derived from the customer key. Each commitment is a hidden meter reading that a sender (the meter for example) has committed to. That is, the sender is unable to later say that the hidden meter reading is lower or higher than the actual value which the sender committed to. The hidden meter reading may be revealed by providing an opening to the commitment.

Batches of commitments to meter readings are formed by placing a plurality of commitments to sequential meter readings into a batch. The batch size is typically fixed depending on buffer capacity and communications link capacity at the meter and provider. For example, sending a batch a day comprising one reading every 30 minutes would involve batching together 48 commitments. A cryptographic signature is generated 306 for each batch using a meter signature key SK. The meter signature key SK is different from the customer key K. The signatures of the batches are sent 308 to the provider. Because the size of the signatures is much lower than the size of the commitments the communications capacity used to send the signatures is reduced.

The meter optionally also sends public information to the provider. For example, this may be information about the health of a system used to provide the resource to the customer. Optionally the public information may be signed by the meter to enable it to be verified by the provider as genuine. The smart meter may obtain this information by monitoring a resource provisioning network for resource availability. For example, by monitoring an electricity network to detect power outages or voltage levels.

Figure 4:
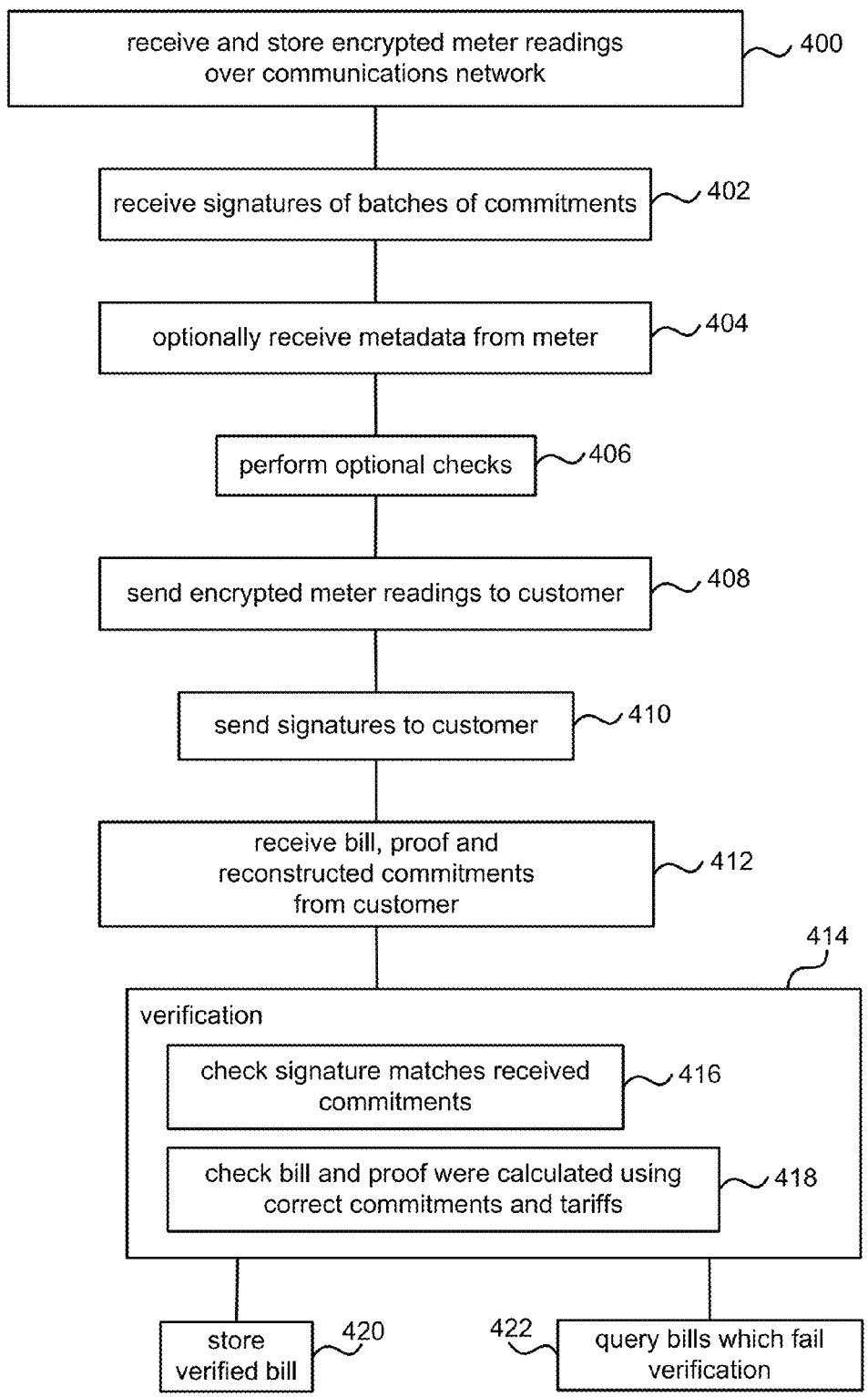
FIG. 4 is a flow diagram of a method at a provider.

FIG. 4 is a flow diagram of a method at computing infrastructure of a provider of the resource. The provider receives and stores 400 the encrypted meter readings from the meter over the communications network. The provider also receives 402 the signatures of the batches of commitments from the meter and optionally also metadata from the meter 404. For example, the metadata may comprise the public information mentioned above.

The provider optionally carries out checks 406 to make sure that the encrypted meter readings, signatures and metadata are received correctly and from the appropriate meter. For example, using a separate digital signature over the encrypted readings as mentioned above. This is a safeguard to enable the provider to check that the information it receives from the meter is actually from the meter and not from another source. More detail about this is given later in this document.

The encrypted meter readings are sent 408 to the customer. The signatures of the batches of commitments are also sent 410 to the customer. For example, the customer may download the encrypted meter readings and signatures as described above with reference to FIG. 1. In other examples, the encrypted readings and signatures are actively sent to the customer. A customer may request encrypted readings and signatures next time he or she is online.

The provider receives 412 a bill, a proof of the bill and reconstructed commitments to the meter readings used to compute the bill, from the customer. A verification process 414 at the provider which is computer implemented is carried out. A check is made to ensure that the signatures of the batches of commitments received from the meter match 416 the re-generated commitments received from the customer. A check 418 is also made to ensure that the bill and proof were calculated using the correct commitments and tariffs. Successfully verified bills are stored 420 and queries 422 are generated for any bills which fail verification.

Figure 5:
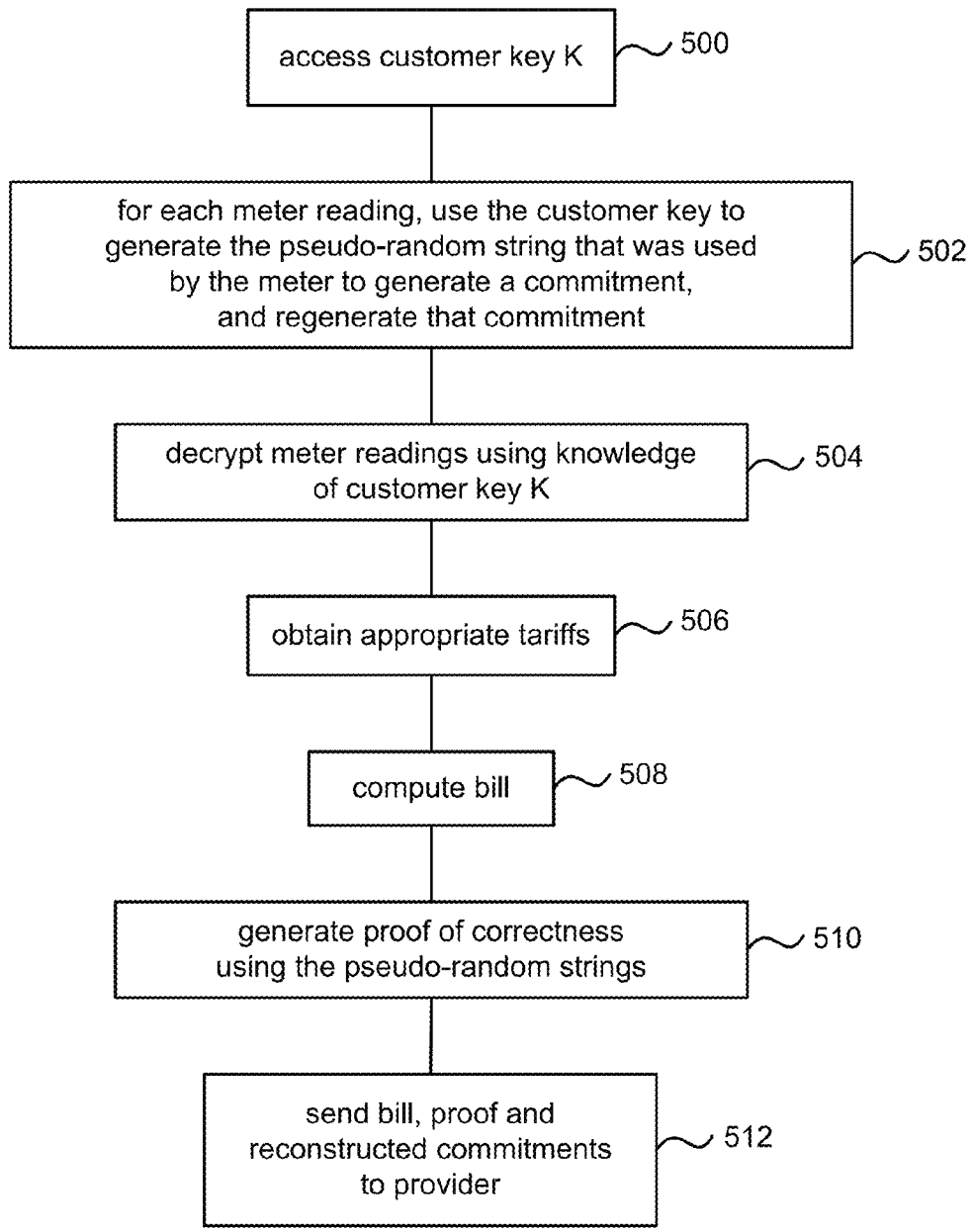
FIG. 5 is a flow diagram of a method at a customer device.

FIG. 5 is a flow diagram of a method at a customer device such as the privacy protecting bill generator 210 of FIG. 2 or the web browser 102 of FIG. 1. The customer key K is available 500 and is shared with the meter as described above. The customer device has received the encrypted meter readings and the signatures of the batches of commitments from the provider. It proceeds to decrypt 504 the meter readings using its knowledge of the customer key K.

For each meter reading the customer device regenerates a commitment. This process may happen in parallel with the decryption or in series with the decryption. The customer key is used to generate a pseudo-random string that was used by the meter to generate a commitment. The pseudo-random string is used to regenerate the commitment at the customer device. By regenerating the commitments in this way bandwidth use is reduced as the commitments themselves are not sent between entities. The customer device obtains appropriate tariffs 506 from the provider. Using the tariffs and the decrypted meter readings a bill is computed 508 which shows only aggregated meter readings. The customer device generates 510 a proof of correctness of the bill using the pseudo-random strings. The bill, proof and reconstructed commitments are sent 512 to the provider.

As mentioned above, in some examples the provider carries out checks to verify that the data it receives is actually from the meter and not from another entity. For example, the meter may generate a hash of the commitments to the meter readings, a hash of any public information from the meter, and a hash of the encrypted meter readings. These three hashes are combined and sent to the provider in addition to the encrypted meter readings, signatures of batches of commitments and public meter information. The provider is able to regenerate the hashes from the information it receives and check that the regenerated hashes match the received combined hash.

Figure 6:
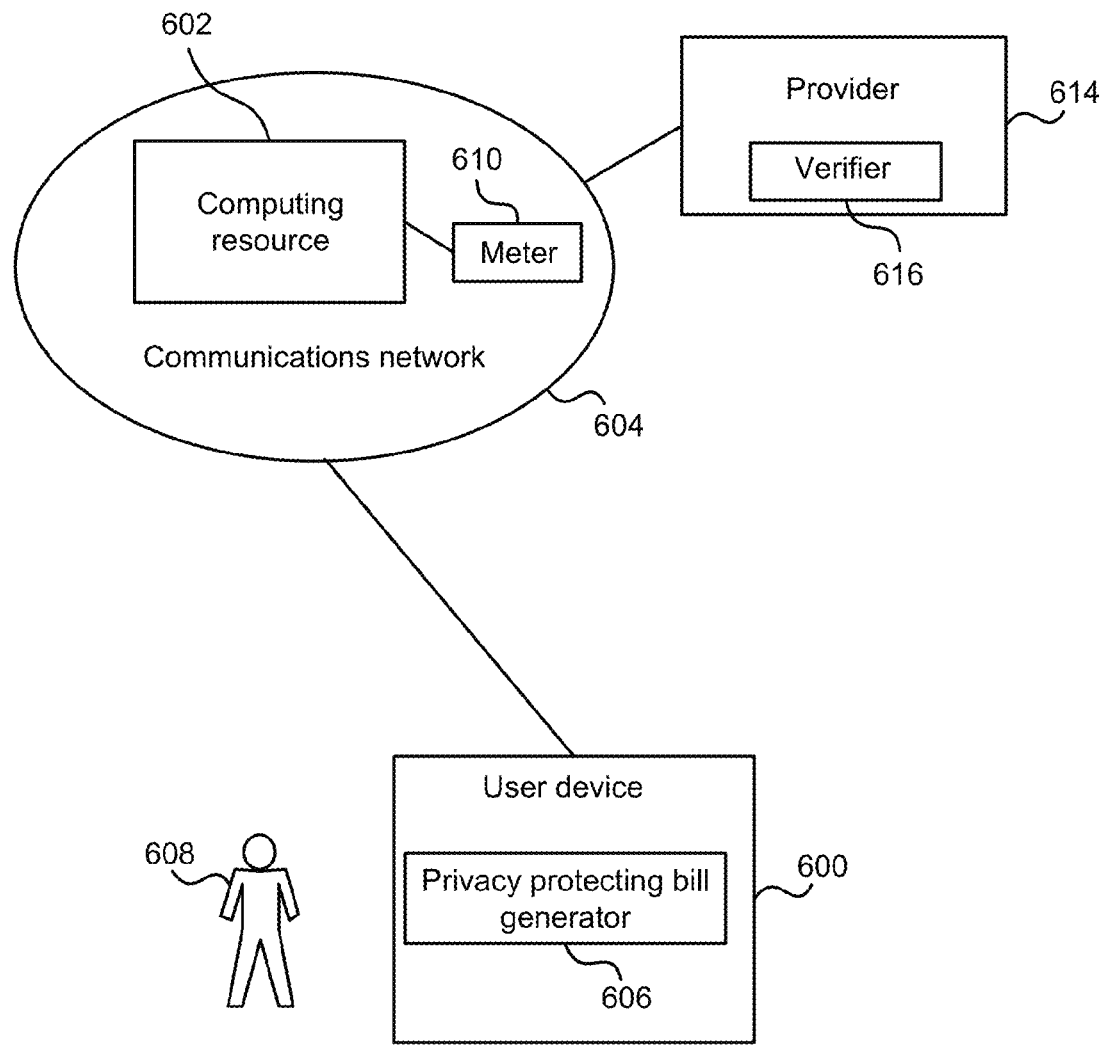
FIG. 6 is a schematic diagram of a privacy-preserving metering system for metering cloud-based services.

FIG. 6 is a schematic diagram of a privacy-preserving metering system for metering cloud-based services. In this example a customer device 600 also incorporates a privacy protecting bill generator 606. Use of a computing resource 602 is metered by a meter 610 associated with the computing resource 602. The computing resource may be a web service, one or more CPUs, GPUs or other processors, a distributed computing resource, one or more computing devices providing software as a service, a social networking service, a public database or other computing resource. The computing resource 602 is accessible to a user device 600 using a communications network 604 of any type. The user device 600 may be a personal computer, a mobile communications device, a laptop computer, a personal digital assistant, or any other computing device which is able to access the computing resource 602 using the communications network 604.

A meter 610 monitors use of the computing resource by the user device 600. The meter 610 is arranged to provide certified meter readings and/or certified commitments to meter readings using a specified commitment scheme. It is not essential for the meter 610 to be connected to the computing resource as illustrated in FIG. 6. The meter may be located at any position such that it is able to monitor consumption of the computing resource by a user 608 in an accurate and certifiable manner.

The user device 600 comprises a privacy protecting bill generator 606 which is in communication with the meter 606 and is arranged to send zero knowledge proofs and privacy protecting bills to a provider 614. The privacy protecting bill generator 606 may be provided at other locations remote of the user device 600.

A provider 614 controls use of the computing resource 602 and charges for use of that computing resource 602 according to one or more pricing policies. It comprises a computer implemented verifier 616 arranged to verify zero knowledge proofs provided by the bill generator.

In the examples now described with reference to FIGS. 7 and 8 example byte lengths for signatures, keys, meter readings, reading timeslots, constants and pseudo-random strings are given. These byte lengths are illustrative and other byte lengths may be used.

Figure 7:
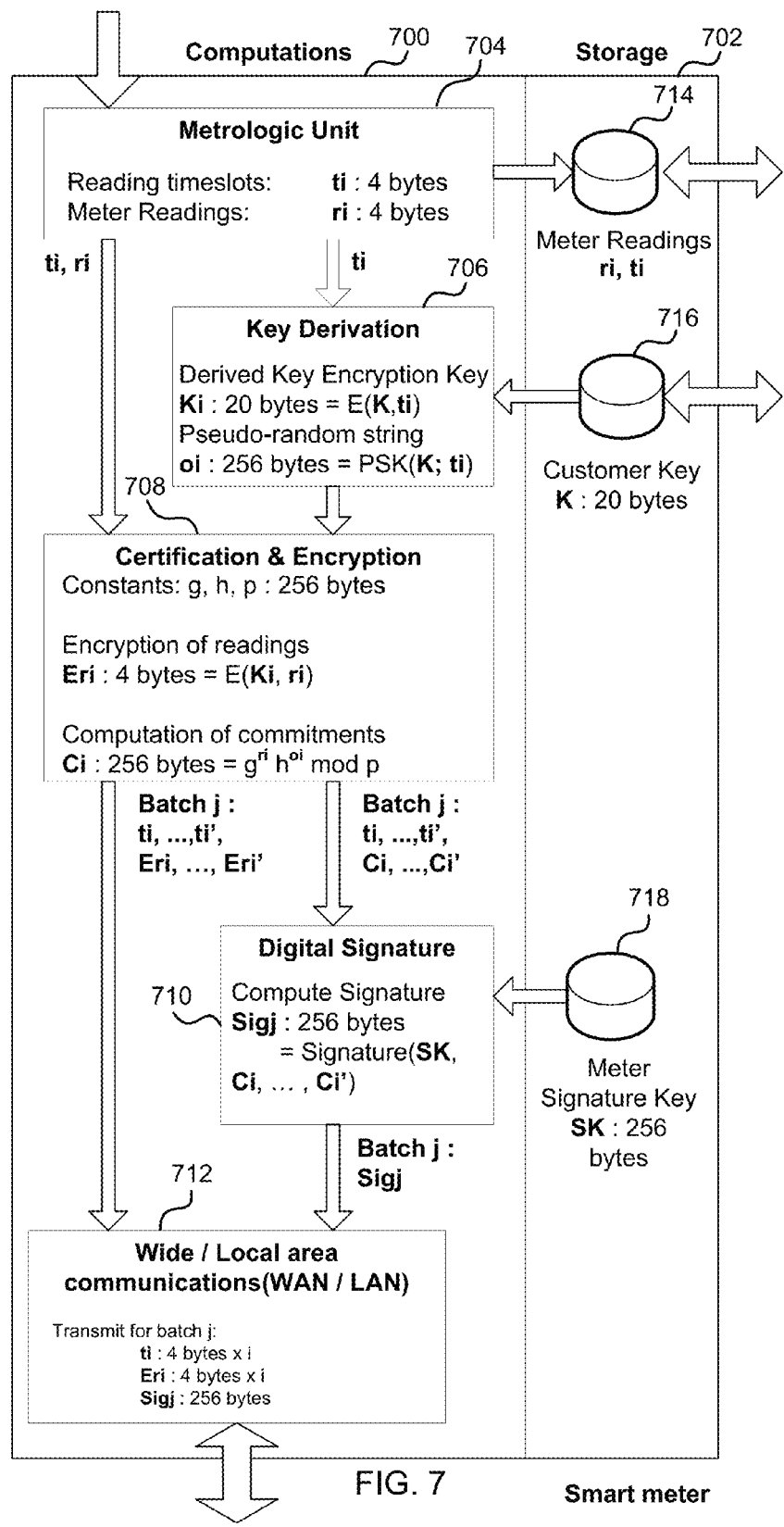
FIG. 7 is a schematic diagram of a meter.

FIG. 7 is a schematic diagram of a meter. It comprises storage 702 which is a memory of any suitable type and one or more processors 700 for executing computer readable instructions. The storage 702 is arranged to store meter readings 714 from a metrologic unit 704 of the meter. The meter readings may be pairs of ri, ti values where ri is a reading value and ti is a time at which the reading was observed or a reading timeslot (e.g. reading number 100 of the day). The storage is also arranged to store a customer key K 716. In this example, 20 bytes are used to store the customer key. However, other sizes of key may be used. A meter signature key SK is also stored 718.

The metrologic unit 704 of the meter monitors consumption of the resource and produces meter readings ri at reading timeslots ti. In this example the timeslots are 4 bytes in size and so are the readings. However, this is not essential, other sizes may be used.

The meter has a key derivation unit 706 which takes the timeslots of the meter readings as input from the metrologic unit. As mentioned above with reference to FIG. 1 the meter may derive temporary keys from the customer key for use in encrypting the meter readings. The key derivation unit 706 is arranged to derive a plurality of temporary keys Ki from the customer key 716, one for each timeslot. Each temporary key Ki may be 20 bytes in size and is formed by applying a function E to Ki, ti pairs. This is written as E(K,ti) in FIG. 7. The key derivation unit 706 is also arranged to generate a pseudo-random string oi which may be 256 bytes in size (although other sizes may be used). The pseudo-random string is formed using the customer key K and timeslot. This is written as oi=PSK(K, ti) in FIG. 7.

Alternative key derivation functions may be used to support additional functionality. For example, a customer key associated with a first meter may be combined with a public key of other meters to allow for privacy friendly aggregation of encrypted meter readings from the first and other meters. In this situation, the encrypted meter readings of a plurality of meters may be added together to reveal the sum of consumption across the plurality of meters.

The meter also comprises a certification and encryption unit 708. This takes input from the key derivation unit 706 and also meter readings from the metrologic unit 704. This unit stores constants g, h, p which are configured by an operator and are constants for use with a commitment scheme to be used by the meter, customer and provider. Storage for the constants g, h and p may be 256 bytes in total although other sizes may be used.

The certification and encryption unit 708 is arranged to encrypt the meter readings. Each encrypted meter reading Eri may be 4 bytes in size although other sizes may be used. Each encrypted meter reading Eri is the result of applying an encryption function E using the temporary key Ki to a reading ri. This is written as Eri=E(Ki, ri) in FIG. 7. The certification and encryption unit 708 is also arranged to compute commitments Ci for each of the meter readings. Each commitment may be 256 bytes in size although other sizes may be used. The commitments are computed using the commitment scheme, the constants and the pseudo-random string of generated by the key derivation unit 706. This is written as $C_i = g^{r_i} h^{o_i} \bmod p$ in FIG. 7.

Batches of encrypted meter readings are formed and provided to a communications interface 712 of the meter. For example, batch j comprises timeslots ti to ti' and encrypted readings Eri to Eri'. Corresponding batches of commitments are formed and sent to a digital signature unit 710 of the meter. In FIG. 7 a batch j of commitments comprises timeslots ti to ti' and commitments Ci to Ci'. The digital signature unit 710 of the meter computes a signature Sig for each batch of commitments using the meter signature key SK 718. For batch j a signature Sigj is computed which may be 256 bytes in size although other sizes may be used. It is computed by applying the meter signature key to each of the commitments in the batch. This is written in FIG. 7 as Sigj=signature(SK, Ci, . . . , Ci'). The signatures of each batch are sent to the communications interface 712. In another example a signature is computed by applying the meter signature key to each of the encrypted readings and commitments in the batch. This is written as Sigj=signature(SK, Eri, . . . , Eri', Ci, . . . , Ci'). In this case the provider is able to verify that the encrypted meter readings are correct.

The communications interface 712 of the meter is arranged to transmit for each batch, the timeslots, the encrypted meter readings and the signature of the commitments. The size of the data to be transmitted may then be 4 bytes for each timeslot, 4 bytes for each encrypted reading and 256 bytes for the signature. The transmission is made over a communications network such as a wide area network, local area network, or any other suitable type of network to the provider.

Figure 8:
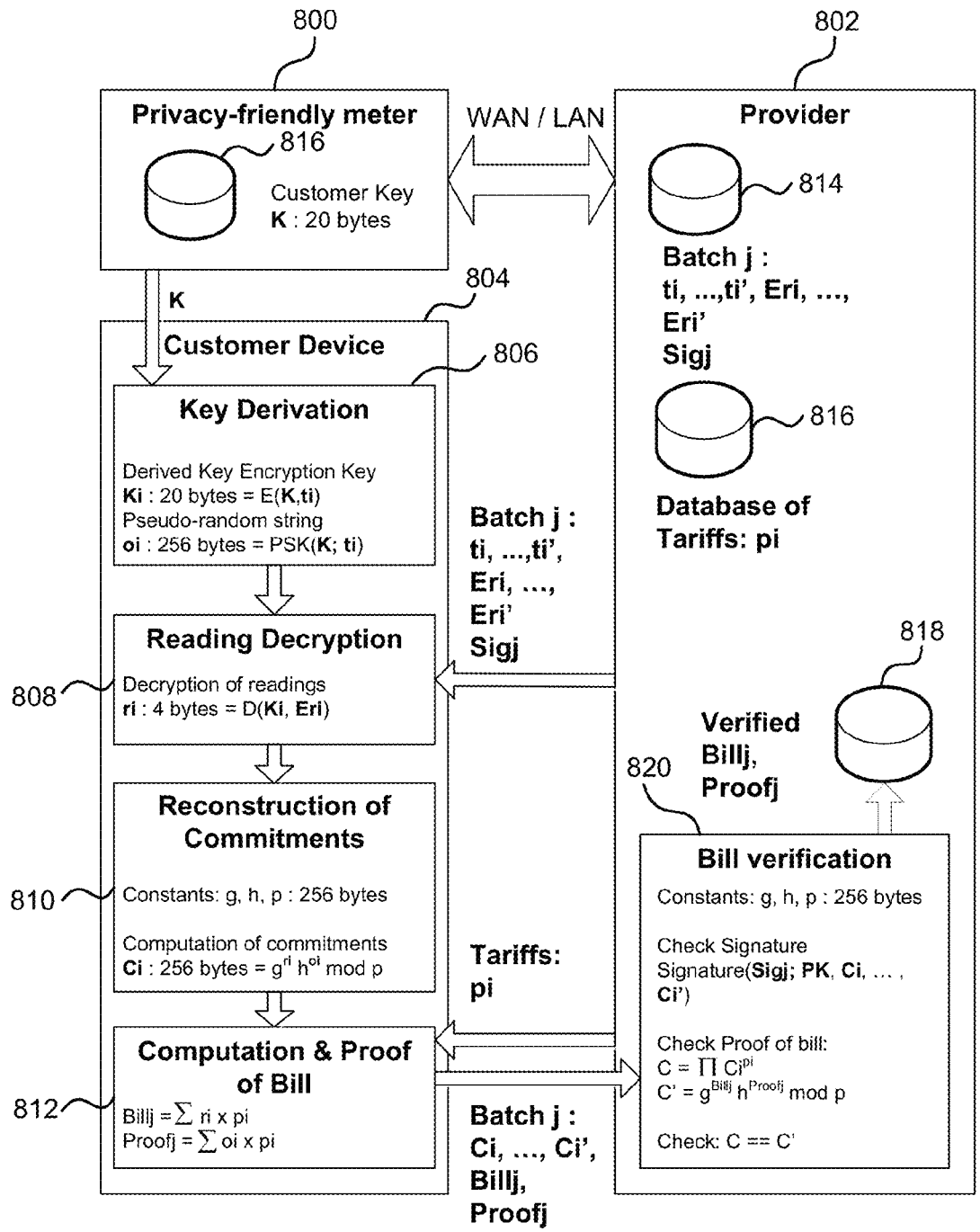
FIG. 8 a schematic diagram of a privacy-preserving metering system for use with the meter of FIG. 7.

FIG. 8 is a schematic diagram of a privacy-preserving metering system for use with the meter of FIG. 7. A privacy-friendly meter 800 such as the meter of FIG. 7 stores a customer key K 816 which is shared with a customer device 804 as indicated in FIG. 8. The privacy-friendly meter 800 transmits encrypted meter readings, signatures and timeslots to a provider 802 as described above with reference to FIG. 7. Thus the provider has storage 814 for batches j of timeslots, encrypted readings and a signature Sigj of commitments for each batch. The provider also stores a database 816 of tariffs pi.

A customer device 804 has a key derivation unit 806 which is similar to the key derivation unit of the meter. The key derivation unit 806 derives a temporary key Ki from the customer key K for each timeslot ti. It also derives a pseudo-random string of from the customer key K.

The customer device 804 comprises a reading decryption unit 808 which downloads or receives the batches of encrypted readings from the provider as well as the signature of commitments Sigj for each batch. The reading decryption unit 808 decrypts the meter readings using the temporary keys Ki. This is written as ri=D(Ki, Eri) in FIG. 8.

The customer device 804 comprises a reconstruction of commitments unit 810. This stores constants g, h, p which are the same constants as use by the certification and encryption unit 708 of the meter. It reconstructs the commitments to the meter readings using the pseudo-random string of and the stored constants. This is written in FIG. 8 as $Ci=g^{ri}h^{oi}$ mod p.

The customer device comprises a bill and proof computation unit 812. This accesses tariffs pi from the provider and calculates a bill as the sum of each reading times its associated tariff. This is written in FIG. 8 as Billj=$\Sigma$ri×pi. It also calculates a proof of the bill. This is written in FIG. 8 as Proofj=$\Sigma$oi×pi. The symbol $\Sigma$ is used here to represent summation.

The bill, proof and reconstructed commitments for each batch are sent to the provider as illustrated in FIG. 8. The provider has a bill verification unit 820 which stores the constants of the commitment scheme g, h, p. The bill verification unit 802 is arranged to check the signatures received from the meter. The provider receives re-generated commitments Ci, . . . , Ci' and checks the signature from the meter using the re-generated commitments. This is written as Check Signature signature(Sigj; PK, Ci, . . . , Ci') in FIG. 8. PK is a public key of the provider.

The bill verification unit 802 is arranged to check the proof of the bill. This is done by checking that the appropriate tariff was used and that the correct commitments were used. This is written in FIG. 8 as $C=\Pi Ci^{pi}$ and $C'=g^{Billj}h^{Proofj}$ mod p. The symbol "$\Pi$" is used here to mean "product". A check is also made that C==C'. The values C and C' are the commitment to the bill, computed in two different manners: C is computed using the commitments to the individual readings, as well as the public tariffs; C' is computed using the Bill and Proof value provided by the customer. For the provider to believe the Bill provided by the customer the two should be equal. The bill verification unit 820 outputs verified bills and proofs to storage 818. In other examples, where other computations which are not necessarily bills are used, the verification unit may output verified computations and proofs of those computations.

In the examples described above the commitment scheme uses constants g, h and p and pseudo-random string oi. It is also possible to use more complex commitment schemes. For example, where each meter reading comprises a triple of three values (ti, ri, vi) then a commitment to a meter reading may be computed as $Ci=g_0{}^{ti}g_1{}^{ri}g_2{}^{vi}h^{oi}$ It is also possible to modify the examples described herein by using cryptography based on elliptic curves. In this way shorter signatures may be generated by the meter and this enables the communications overhead from the meter to the provider or other entity to be even further reduced.

A detailed example of a protocol which may be used to implement the methods described herein is now given. Detail is given in U.S. patent application Ser. No. 12/901,214 "Privacy-preserving metering" filed on 8 Oct. 2010 and which is incorporated herein by reference in its entirety.

In an example, a signature scheme is used which consists of the algorithms (Keygen; Sign; Verify). Keygen($1^k$) outputs a key pair (sk, pk). Sign(sk,m) outputs a signature s on message m. Verify(pk, s, m) outputs accept if s is a valid signature on m and reject otherwise. This definition can be extended to support multi-block messages m={$m_1$, . . . , $m_n$}. Existential unforgeability is provided whereby a p.p.t. adversary is unable to output a message-signature pair (s, m) unless that adversary has previously obtained a signature on m.

In this example a non-interactive commitment scheme is used which consists of the algorithms ComSetup, Commit and Open. ComSetup($1^k$) generates the parameters of the commitment scheme $par_c$. Commit($par_c$,x) outputs a commitment $c_x$ to x and auxiliary information $open_x$. A commitment is opened by revealing (x,$open_x$) and checking whether Open ($par_c$,$c_x$,c,$open_x$) outputs accept. The commitment scheme has a hiding property and a binding property. Informally speaking, the hiding property ensures that a commitment $c_x$ to x does not reveal any information about x, whereas the binding property ensures that $c_x$ may not be opened to another value x'. A commitment scheme is said to be additively homomorphic if, given two commitments $c_{x_1}$ and $c_{x_2}$ with openings ($x_1$,$open_{x_1}$) and ($x_2$,$open_{x_2}$) respectively, there exists an operation such that, if c=$c_{x_1}\otimes c_{x_2}$, then Open($par_c$,c,$x_1+x_2$,$open_{x_1}$+$open_{x_2}$) outputs accept. Additionally, the commitment scheme may also provide an operation between a commitment $c_{x_1}$ and a value $x_2$ such that, if c=$_{x_1}$ $x_2$, then Open($par_c$,c,$x_1 \times x_2$, $open_{x_1} \times x_2$) outputs accept.

In this example a trapdoor commitment scheme is used, in which algorithm ComSetup($1^k$) generates $par_c$ and a trapdoor td. Given a commitment c with opening ($x_1$,$open_{x_1}$) and a value $x_2$, the trapdoor td allows finding $open_{x_2}$ such that algorithm $Open(par_c, c, x_2, open_{x_2})$ outputs accept.

In this example, a zero-knowledge proof of knowledge is a two-party protocol between a prover and a verifier. The prover proves to the verifier knowledge of some secret input (witness) that fulfills some statement without disclosing this input to the verifier. The protocol fulfills two properties. First, it is a proof of knowledge, i.e., a prover without knowledge of the secret input convinces a verifier with negligible probability. More technically, there exists a knowledge extractor that extracts a secret input from a successful prover with all but negligible probability. Second, it is zero-knowledge, i.e., the verifier may learn nothing but the truth of the statement. More technically, for possible verifiers there exists a simulator that, without knowledge of the secret input, yields a distribution that is indistinguishable from the interaction with a real prover. Witness indistinguishability is a weaker property that requires that the proof does not reveal which witness (among all possible witnesses) was used by the prover.

In the example, the bill generator may generate the zero knowledge proofs using any one or more of the following: proof of knowledge of a discrete logarithm; proof of knowledge of the equality of some element in different representations; proof with interval checks, range proof and proof of the disjunction or conjunction of any two of the previous. These results are often given in the form of $\Sigma$ protocols but they may be turned into non-interactive zero-knowledge arguments in the random oracle model via the Fiat-Shamir heuristic. When referring to the proofs above, this document follows the notation introduced by Camenisch and Stadler for various proofs of knowledge of discrete logarithms and proofs of the validity of statements about discrete logarithms.

$$NIPK\{(\alpha,\beta,\delta): y = g_0^\alpha g_1^\beta \wedge \tilde{y} = \tilde{g}_0^\alpha \tilde{g}_1^\delta \wedge A \le \alpha \le B\}$$

denotes

"zero-knowledge Proof of Knowledge of integers $\alpha$, $\beta$, and $\delta$ such that $y = g_0^\alpha g_1^\beta$, $\tilde{y} = \tilde{g}_0^\alpha \tilde{g}_1^\delta$ and $A \le \alpha \le B$ holds"

where $y, g_0, g_1, \tilde{y}, \tilde{g}_0, \tilde{g}_1$ are elements of some groups $y, g_0, g_1, \tilde{y}, \tilde{g}_0, \tilde{g}_1$ that have the same order. (Note that some elements in the representation of $y$ and $\tilde{y}$ are equal). The convention is that letters in the parenthesis, in this example, $\alpha, \beta$ and $\delta$, denote quantities whose knowledge is being proven, while other values are known to the verifier. In this document a non-interactive proof of signature possession is denoted as $NIPK\{(x, s_x): Verify(pk, x, s_x) = accept\}$.

In this example, the signature schemes used by M, U and P are denoted as: (Mkeygen;Msign;Mverify), (Ukeygen;Usign; Uverify) and (Pkeygen;Psign;Pverify). H stands for a collision-resistant hash function.

In a setup phase, meter M runs $Mkeygen(1^k)$ to obtain a key pair $(sk_M, pk_M)$, user (customer) U runs $Ukeygen(1^k)$ to get a key pair $(sk_U, pk_U)$ and provider P runs $Pkeygen(1^k)$ to get a key pair $(sk_P, pk_P)$. Each party registers its public key with a trusted registration entity and retrieves public keys from other parties by querying the trusted registration entity. P runs $ComSetup(1^k)$ to get $par_c$ and a trapdoor td, computes a proof $$\pi = NIPK\{(td): (par_c, td) \leftarrow ComSetup(1^k)\} \text{ and sends}$$

$(par_c, \pi)$ to $U$ and $(par_c)$ to $M$. $U$ verifies $\pi$.

An example protocol for privacy providing metering comprises the following phases, initialization, consumption, payment and reveal. These phases are now described in more detail.

Initialization

When P is activated with (policy, $\Upsilon$), P runs $SignPolicy(sk_P, \Upsilon)$ to get a signed policy $\Upsilon_s$. P sends $\Upsilon_s$ to U. U runs $VerifyPolicy(pk_P, \Upsilon_s)$ to get a bit b. If b=0, U rejects the policy. Otherwise U stores $\Upsilon_s$. M and U agree on a shared key to be used to encrypt readings (cons, other) and derive all $open_{cons}$ and $open_{other}$ values Consumption When M is activated with (consume, cons, other), M increments a counter $d_M$ (initialized at zero) and runs $SignConsumption(sk_M, par_c, cons, other, d_M)$ to obtain a signature over a commitment of cons and other denoted as SC. M encrypts (cons, other) as E and sends (E, SC) to the provider P. P increments a counter $d_U$ and runs $VerifyConsumption(pk_M, par_c, SC, d_u)$ to obtain a bit b. If b=0, U rejects SC and sends P a message indicating malfunctioning meter. Otherwise U appends SC to a table T that stores all the consumptions.

Payment

When P is activated with (payment), P sends (payment) to U, along with all E and SC. U can decrypt (cons, other) from E using the symmetric key it shares with the meter, and reconstruct $open_{cons}$ and $open_{other}$ necessary and recompute commitments $c_{cons}$ and $c_{other}$. Let N be the number of (consume, ...) messages received by U since the previous message (payment) was received. U runs $Pay(sk_U, par_c, \Upsilon_s, T[d_U - N : d_U])$ to obtain a payment message Q and sends (Q) to P. P runs $VerifyPayment(pk_M, pk_U, pk_P, par_c, Q, d_P)$ to obtain $(b, d'_P)$. If b=0, P rejects the payment, and otherwise accepts it and sets $d_P = d'_P$.

Reveal

When P is activated with (reveal, i), P checks that $i \in [0, d_P]$ and sends (i) to U. U runs $Reveal(sk_U, T, i)$ to get an opening message R and sends (R) to P. P picks the payment message Q that contains i and runs $VerifyReveal(pk_U, par_c, Q, R, i)$ to get a bit b. If b=0, P sends (reject, Q, R) to U, and otherwise it sends (accept) to U. Examples of the functions used in the example protocol phases are now specified.

$SignPolicy(sk_P, \Upsilon)$.

For each tuple $(cons, other, price) \in \Upsilon$, compute $sp = Psign(sk_P \langle cons, other, price \rangle)$. (The way the tuples (cons, other, price) are signed depends on the particular policy $\Upsilon$ to be signed as described in more detail below). Let $\Upsilon_s = (cons_i, other_i, price_i, sp_i)_{i=1}^n$ be the set of message-signature tuples.

Output $\Upsilon_s$.

$VerifyPolicy(pk_P, \Upsilon_s)$.

For i=1 to n, parse $\Upsilon_s$ as $(cons_i, other_i, price_i, sp_i)_{i=1}^n$, and, for i=1 to n, run $Pverify(pk_P, sp_i, \langle cons_i, other_i, price_i \rangle)$. If any of the outputs is reject, output b=0, and otherwise output b=1.

$SignConsumption(sk_M, par_c, cons, other, d_M)$.

Execute both $(c_{cons}, open_{cons}) = Commit(par_c, cons)$ and $(C_{other}, open_{other}) = Commit(par_c, other)$. Run $sc = Msign(sk_M, \langle d_M, c_{cons}, c_{other} \rangle)$ and output $SC = (d_M, sc)$.

$VerifyConsumption(pk_M, par_c, SC, d_U)$.

Parse message SC and E as $(d_M, cons, open_{cons}, c_{cons}, other, open_{other}, c_{other}, sc)$.

Compute $Open(par_c, c_{cons}, cons, open_{cons})$ and $Open(par_c, c_{other}, other, open_{other})$ and output b=0 if any of them outputs reject. Run $Mverify(pk_M, sc, \langle d_U, c_{cons}, c_{other} \rangle)$ and output b=0 if the output is reject.

Otherwise output b=1.

$Pay(sk_U, par_c, \Upsilon_s, T)$.

For each entry $(d_M, cons, open_{cons}, c_{cons}, other, open_{other}, c_{other}, sc) \in T$, calculate price $= \Upsilon(cons, other)$, run $(c_{price}$, $\text{open}_{price}$)=Commit($\text{par}_c$,price) and calculate a non-interactive witness-indistinguishable proof $\pi$:[1]

$$NIPK\{(\text{price}, \text{open}_{price}, \text{cons}, \text{open}_{cons}, \text{other}, \text{open}_{other}, sp):$$
$$(c_{cons}, \text{open}_{cons}) = \text{Commit}(\text{par}_c, \text{cons}) \wedge (c_{other}, \text{open}_{other}) =$$
$$\text{Commit}(\text{par}_c, \text{other}) \wedge (c_{price}, \text{open}_{price}) = \text{Commit}(\text{par}_c, \text{price}) \wedge$$
$$\text{Pverify}(pk_P, sp, \langle\text{cons}, \text{other}, \text{price}\rangle) = \text{accept}\}$$

Let N be the number of entries in T. Compute the total fee fee=$\sum_{i=1}^{N}\text{price}_i$ and add all the openings $\text{open}_{fee}=\sum_{i=1}^{N}\text{open}_{price_i}$ to get an opening to the commitment to the fee. Set a payment message p=(fee,$\text{open}_{fee}$,$\{sc_i, d_M, c_{cons_i}, c_{other_i}, c_{price_i}, \pi_i\}_{i=1}^{N}$). Compute a signature[2] $sp=\text{Usign}(sk_U,p)$ and set a payment message Q=(p,$s_p$). VerifyPayment($pk_M, pk_U, pk_P, \text{par}_c, Q, dp$). Parse Q as (p,$s_p$) and run Uverify($pk_U, s_p$, p). Output b=0 if it rejects. Otherwise parse p as (fee,$\text{open}_{fee}$,$\{sc_i, d_i, c_{cons_i}, c_{other_i}, c_{price_i}, \pi_i\}_{i=1}^{N}$) and, for i=1 to N, increment $d_p$, run Mverify($pk_M, sc_i, \langle d_p, c_{cons_i}, c_{other_i}\rangle$) and verify $\pi_i$. Output b=0 if any of the signatures or the proofs is not correct. Add the commitments to the prices $c'_{fee}=\otimes_{i=1}^{N} c_{price_i}$ and execute Open($\text{par}_c, c'_{fee}, \text{fee}, \text{open}_{fee}$). If the output is accept, set b=1 and otherwise b=0. Output (b,$d_p$).

Reveal($sk_U$,T,i).

Pick the tuple r=(i,cons,$\text{open}_{cons}$,other,$\text{open}_{other}$) in the entry (i, . . . )$\in$T, sign $s_r$=Usign($sk_U$,r) and output R=(r,$s_r$).

VerifyReveal($pk_U, \text{par}_c, Q, R, j$).

Parse Q as (p,$s_p$) and p as (fee,$\text{open}_{fee}$,$\{sc_i, d_i, c_{cons_i}, c_{other_i}, c_{price_i}, \pi_i\}_{i=1}^{N}$). Pick the tuple ($sc_i, d_i, c_{cons_i}, c_{other_i}, c_{price_i}, \pi_i$) such that $d_i$=j. Parse R as (r,$s_r$) and r as (i,cons,$\text{open}_{cons}$,other,$\text{open}_{other}$). Run algorithms Open($\text{par}_c, c_{cons}$, cons,$\text{open}_{cons}$) and Open($\text{par}_c, c_{other}$,other,$\text{open}_{other}$). If both algorithms output accept, output b=1 and otherwise b=0.

The provider is able to use different forms of pricing policy. For example, a discrete pricing policy, a linear pricing policy, a cumulative pricing policy, and a pricing policy defined by one or more polynomial functions. The way the tuples (cons; other; price) are signed depends on the particular form of policy to be signed and this in turn affects what the zero-knowledge proof needs to show. Examples of different types of pricing policy are now given together with examples of methods of signing the tuples for each of those types of pricing policy and examples of how to generate a zero-knowledge proof appropriate to each type of pricing policy. In general, more complex pricing policies require more complex zero-knowledge proofs since there is more to prove. Careful design of the data structures used for the pricing policy and the signed tuples is therefore important since it affects the computational complexity and efficiency at the bill generator and verifier. As mentioned above, it is not essential to compute a bill. Other computations may be made in place of the bill in the examples described herein. In that case, other information may be provided about the computation in place of the pricing policy.

Discrete Pricing Policy.

A discrete pricing policy considers a discrete domain described by n tuples (cons,other). Each tuple is mapped to a price price. To sign the policy, for i=1 to n, P runs $sp_i$=Psign($sk_P, \langle \text{cons}_i, \text{other}_i, \text{price}_i\rangle$), and sets $\Upsilon_s$=(cons$_i$,other$_i$,price$_i$,$sp_i$)$_{i=1}^{N}$.

To compute the proof $\pi$, U uses the commitments to the consumption $c_{cons}$ and to other parameters $c_{other}$ included in sc, and commits to the price ($c_{price}$,$\text{open}_{price}$)=Commit($\text{par}_c$, price) specified in the policy for (cons,other). Then U proves possession of a signature sp$\in \Upsilon_s$ on (cons,other,price) and equality between the signed values and the values committed to in ($c_{cons}, c_{other}, c_{price}$). The non interactive zero knowledge proof (NIPK) is then:

$$NIPK\{(\text{price}, \text{open}_{price}, \text{cons}, \text{open}_{cons}, \text{other}, \text{open}_{other}, sp):$$
$$(c_{cons}, \text{open}_{cons}) = \text{Commit}(\text{par}_c, \text{cons}) \wedge (c_{other}, \text{open}_{other}) =$$
$$\text{Commit}(\text{par}_c, \text{other}) \wedge (c_{price}, \text{open}_{price}) = \text{Commit}(\text{par}_c, \text{price}) \wedge$$
$$\text{Pverify}(pk_P, sp, \langle\text{cons}, \text{other}, \text{price}\rangle) = \text{accept}\}$$

Linear Pricing Policy.

A discrete policy is beneficial when the set of possible consumption values is finite and small. Otherwise, signing all possible tuples (cons,other) may be inefficient. A linear policy, instead of specifying the price of each possible consumption, specifies the price per unit. For instance, if a policy says that the price per unit is 3 and the consumption is 6, the price due is 18. Therefore, since a linear policy specifies the price per unit of consumption, it is given by $\Upsilon$:other$\rightarrow$price. The parameter other denotes any variable that influences the price per unit, e.g., the time interval in which the consumption takes place.

To sign this policy, for i=1 to n, P runs $sp_i$=Psign($sk_P, \langle\text{other}_i, \text{price}_i\rangle$), and sets $\Upsilon_s$=(other$_i$,price$_i$,$sp_i$)$_{i=1}^{n}$. To compute a proof $\pi$, U uses the commitments to the consumption $c_{cons}$ and to other parameters $c_{other}$ included in sc, and commits to the total price price$_t$(($c_{price_t}$,$\text{open}_{price_t}$)=Commit($\text{par}_c$, price$_t$)). (The total price equals price$_t$=price·cons, where price=$\Upsilon$(other).)

Then U computes a proof of possession of a signature sp$\in \Upsilon_s$ on (other,price), a proof of equality between other and the values committed to in $c_{other}$, and a proof that price$_t$ committed to in $c_{price_t}$ equals price·cons. The non interactive proof of knowledge is then:

$$NIPK\{(\text{price}, \text{open}_{price}, \text{cons}, \text{open}_{cons}, \text{other}, \text{open}_{other}, sp):$$
$$(c_{cons}, \text{open}_{cons}) = \text{Commit}(\text{par}_c, \text{cons}) \wedge (c_{other}, \text{open}_{other}) =$$
$$\text{Commit}(\text{par}_c, \text{other}) \wedge (c_{price}, \text{open}_{price}) = \text{Commit}(\text{par}_c, \text{price}) \wedge$$
$$\text{Pverify}(pk_P, sp, \langle\text{cons}, \text{other}, \text{price}\rangle) = \text{accept}\}$$

Interval Pricing Policy.

In an interval policy, the consumption values domain is divided into intervals and each interval is mapped to a price. For instance, if the policy says that all the consumptions between 4 and 7 must pay price 3 and the consumption is 5, the price due is 3. Therefore, an interval policy is given by $\Upsilon$:(cons$_{min}$,cons$_{max}$,other)$\rightarrow$price, where it is required that intervals defined by [cons$_{min}$,cons$_{max}$] be disjoint.

To sign this policy, for i=1 to n, P runs $sp_i$=Psign($sk_P, \langle \text{cons}_{min_i}, \text{cons}_{max_i}, \text{other}_i, \text{price}_i\rangle$), and sets $\Upsilon_s$=(cons$_{min_i}$,cons$_{max_i}$,other$_i$,price$_i$,$sp_i$)$_{i=1}^{n}$. (Note that if $\pi$ is a monotonic function, then it is enough to sign cons$_{max}$ (when the function is increasing) or cons$_{min}$ (when the function is decreasing)). To compute a proof $\pi$, U uses the commitments to the consumption $c_{cons}$ and to other parameters $c_{other}$ included in sc, and commits to the price ($c_{price}$,$\text{open}_{price}$)=Commit($\text{par}_c$, price) specified in the policy for (cons$_{min}$,cons$_{max}$,other) such that cons$\in$[cons$_{min}$,cons$_{max}$]. Then U computes a proof of possession of a signature sp $\in \Upsilon_s$ on ($cons_{min}$,$cons_{max}$,other,price), a proof of equality between (other,price) and the values committed to in ($c_{other}$,$c_{price}$), and a proof that cons $\in[cons_{min},cons_{max}]$. If the policy is monotonically increasing, it suffices to prove that $\in[0,cons_{max}]$, while if it is monotonically decreasing, it suffices to prove that cons $\in[cons_{min},\infty]$. The non interactive proof of knowledge is then:

$NIPK\{(\text{price}, open_{price}, cons, open_{cons}, \text{other}, open_{other}, cons_{min}, cons_{max},$ $sp): (c_{cons}, open_{cons}) = \text{Commit}(par_c, cons) \wedge (c_{other}, open_{other}) =$ $\text{Commit}(par_c, \text{other}) \wedge (c_{price}, open_{price}) =$ $\text{Commit}(par_c, \text{price}) \wedge \text{Pverify}(pk_P, sp, \langle cons, \text{other}, \text{price}\rangle) =$ $\text{accept} \wedge cons \in [cons_{min}, cons_{max}]\}$ Cumulative Pricing Policy.

As in the case of the interval policy, the consumption values domain is divided into intervals and each interval is mapped to a price. However, in this case this price is a price per unit of consumption. The price due is the definite integral of the policy $\Upsilon$ over the interval [0, cons]. For instance, let $\Upsilon$ be a policy as follows: $[0,3] \to 2,(3,7] \to 5,(7,\infty)$, (the parameter other is left unused) and let the consumption be 9. The price due is $3 \times 2 + 4 \times 5 + 2 \times 8 = 42$. Therefore, a cumulative policy is given by $\Upsilon:(cons_{min},cons_{max},F,\text{other}) \to \text{price}$, where it is required that intervals defined by $[cons_{min},cons_{max}]$ be disjoint. F is the definite integral of $\Upsilon$ over the $[0,cons_{min}]$. To sign this policy, for i=1 to n, P runs $sp_i=\text{Psign}(sk_P,\langle cons_{min_i},$ $cons_{max_i},F_i,\text{other}_i,\text{price}_i\rangle)$, and sets $\Upsilon_s=(cons_{min_i},cons_{max_i},F_i,$ $\text{other}_i,\text{price}_i,sp_i)_{i=1}^n$. In the previous example, the tuples to be signed are $(0,3,0,\perp,2),(3,7,6,\perp,5)$ and $(7,\text{max},26,\perp,8)$ (max represents the maximum consumption). To compute a proof $\pi$, U uses the commitments to the consumption $c_{cons}$ and to other parameters $c_{other}$ included in sc, and commits to the price $\text{price}_t((c_{price_t},open_{price_t})=\text{Commit}(par_c,\text{price}_t))$ to be paid, which equals $\text{price}_t=(\text{cons}-\text{cons}_{min}) \times \text{price}+F)$. Then U computes a proof of possession of a signature $sp \in \Upsilon_s$ on $(\text{cons}_{min},\text{cons}_{max},F,\text{other},\text{price})$, a proof of equality between (other) and the value committed to in $c_{other}$, a proof that $\text{cons} \in [\text{cons}_{min},\text{cons}_{max}]$ and a proof that $\text{price}_t=(\text{cons}-\text{cons}_{min}) \times \text{price}+F$. The non interactive proof of knowledge is then:

$NIPK\{(\text{price}_t, open_{price_t}, cons, open_{cons}, \text{other}, open_{other},$ $\text{price}, cons_{min}, cons_{max}, F, sp): (c_{cons}, open_{cons}) =$ $\text{Commit}(par_c, cons) \wedge (c_{other}, open_{other}) =$ $\text{Commit}(par_c, \text{other}) \wedge (c_{price_t}, open_{price_t}) = \text{Commit}(par_c, \text{price}_t) \wedge$ $\text{Pverify}(pk_P, sp, \langle cons_{min}, cons_{max}, F, \text{other}, \text{price}\rangle) =$ $\text{accept} \wedge cons \in [cons_{min}, cons_{max}] \wedge \text{price}_t =$ $(cons - cons_{min}) \times \text{price} + F\}$ Other Pricing Polices.

Another possible policy $\Upsilon$ is that defined by a polynomial function $\Sigma_{i=0}^N a_i x_i$ over a commutative ring R, which in an implementation is given by the integers modulo a composite. This gives the benefit that any pricing policy can be approximated to an arbitrary precision. The price due is the evaluation of $\Upsilon$ on input the consumption x=cons.

Let n be the number of polynomials that define the policy (e.g., each of them associated with a different parameter other). To sign this policy, for i=1 to n, P runs $sp_i=\text{Psign}(sk_P,$ $\langle a_{Ni},\ldots,a_{0i},\text{other}_i\rangle)$, and sets $\Upsilon_s=(a_{Ni},\ldots,a_{0i},\text{other},sp_i)_{i=1}^n$. To compute a proof $\pi$, U uses the commitments to the consumption $c_{cons}$ and to other parameters $c_{other}$ included in sc, and commits to the price $\text{price}_t((c_{price_t},open_{price_t})=\text{Commit}(par_c,\text{price}_t))$ to be paid, which equals $\text{price}_t=\Sigma_{i=0}^N a_i cons^i$. Then U computes a proof of possession of a signature $sp \in \Upsilon_s$ on $(a_N,\ldots,a_0,\text{other})$, a proof of equality between (other) and the value committed to in $c_{other}$, and a proof that $\text{price}_t=\Sigma_{i=0}^N a_i cons^i$. The non interactive proof of knowledge is then:

$NIPK\{(\text{price}_t, open_{price_t}, cons, open_{cons}, \text{other}, open_{other}, sp):$ $(c_{cons}, open_{cons}) = \text{Commit}(par_c, cons) \wedge (c_{other}, open_{other}) =$ $\text{Commit}(par_c, \text{other}) \wedge (c_{price_t}, open_{price_t}) =$ $\text{Commit}(par_c, \text{price}_t) \wedge \text{Pverify}(pk_P, sp, \langle a_N, \ldots, a_0, \text{other}\rangle) =$ $\text{accept} \wedge \text{price}_t = \sum_{i=0}^{N} a_i cons^i\}$ Particular examples of the commitment scheme, the signature schemes and the non-interactive proofs of knowledge which may be used are now given. These are examples only.

An integer commitment scheme may be used as now described.

For the example integer commitment scheme let $l_n$ be the bit-length of an RSA modulus n and $l_r$ be the bit-length of the security parameter. Example values are $l_n=2048$ and $l_r=80$. The scheme is then:

CompSetup($1^k$). Given an RSA modulus, pick a random generator $h \in QR_n$. Pick random $\alpha_1,\ldots,\alpha_k \leftarrow \{0,1\}^{l_n+l_r}$ and, for i=1 to k, compute $g_i=h^{\alpha_i}$. Output commitment parameters $par_c=(g_1,\ldots,g_k,h,n)$ and trapdoor $td=(\alpha_1,\ldots,\alpha_k)$.

Commit ($par_c,\langle m_1,\ldots,m_k\rangle$). On input integers ($m_1,\ldots,m_k$) of length $l_m$, choose a random open$\in\{0,1\}^{l_n+l_r}$, and compute $C=g_1^{m_1} \cdot \ldots \cdot g_k^{m_k} h^{open}$ (mod n). Output the commitment c and the opening open.

Open($par_c,c,\langle m_1',\ldots,m_k'\rangle$,open'). On inputs integers ($m_1',\ldots,m_k'$) and open', compute $c'=g_1^{m_1'} \cdot \ldots \cdot g_k^{m_k'} h^{open'}$ (mod n) and check whether c=c'.

Signature Schemes.

The signature schemes of M and U may be instantiated with any existentially unforgeable signature scheme. For P's signature scheme, a Camenisch and Lysyanskaya signature scheme may be used in some examples as now described. This is beneficial in the embodiments described herein because it is partially re-randomizable and has efficient proofs of signature possession.

Keygen($1^k$). On input $1^k$, generate two primes p, q of length k such that p=2p'+1 and q=2q'+1, where p' and q' are also primes. The RSA modulus of length $l_n$ is defined as n=pq. Output secret key sk=(p, q). Choose uniformly at random $S \leftarrow QR_n$, and $R_1,\ldots,R_k,Z \leftarrow \langle S\rangle$. Compute a non-interactive zero-knowledge proof $\pi = NIPK\{[x_Z, x_{R_1}, \ldots, x_{R_l}]: Z = S^{x_Z} \wedge R_1 = S^{x_{R_1}} \wedge \ldots \wedge R_l = S^{x_{R_l}}\}.$ Output public key pk=(n,$R_1,\ldots,R_k$,S,Z,$\pi$).

Sign (sk,$\langle m_1,\ldots,m_k\rangle$). On input messages ($m_1,\ldots,m_k$) of length $l_m$, choose a random prime number e of length $l_e > l_m + 2$, and a random number $v$ of length $l_v = l_n + l_m + l_r$. Compute the value $A$ such that $Z = A^e R_1^{m_1} \cdot \ldots \cdot R_k^{m_k} S^v \pmod{n}$. Output the signature $s = (e, A, v)$.

Verify$(pk, s, \langle m_1, \ldots, m_k \rangle)$. On inputs messages $(m_1, \ldots, m_k)$ and signature $s = (e, A, v)$, check that $Z \equiv A^e R_1^{m_1} \cdot \ldots \cdot R_k^{m_k} S^v \pmod{n}$, that $m_i \in \pm \{0,1\}^{l_m}$, and that $2^{l_e} \leq e \leq 2^{l_e - 1}$.

Example values are $l_n = 2048$, $l_r = 80$, $l_m = 256$, $l_e = 597$, $l_v = 2724$ ([29]).

Examples of basic buildings blocks that compose the non-interactive zero-knowledge proofs utilized in the embodiments are now given. Such non-interactive zero-knowledge proofs consist of the conjunction of some of these building blocks. The basic building blocks may be a non-interactive zero-knowledge proof of possession of a Camenisch-Lysyanskaya signature, a proof that a committed value is the product of two committed values and a proof that a committed value lies in an interval.

To prove possession of a Camenisch-Lysyanskaya signature, an example method is:

Given a signature $s = (e, A, v)$ on messages $(m_1, \ldots, m_k)$, randomize the signature $s$ by picking random $r \leftarrow \{0,1\}^{l_r + l_\varnothing}$ and computing $(e, A' = AS^{-r} \pmod{n}, v' = v + er)$. Additionally set $e' = e - 2^{l_e - 1}$. Send $A'$ to the verifier along with the following non-interactive zero-knowledge proof:

$$NIPK\{(e, v, m_1, \ldots, m_k) : Z \equiv \pm A^e R_1^{m_1} \cdot \ldots \cdot R_k^{m_k} S^v \pmod{n} \wedge$$

$$m_i \in \{0,1\}^{l_m + l_H + l_\varnothing + 2} \wedge e - 2^{l_e - 1} \in \{0,1\}^{l_e' + l_H + l_\varnothing + 2}\}$$

This proof becomes a non-interactive zero-knowledge argument via the Fiat-Shamir heuristic as follows. (The other proofs in the embodiments may be computed via the Fiat-Shamir heuristic in a similar way.) Let $H$ be a hash function modeled as a random oracle. The prover picks random values:

$$r_e \leftarrow \{0,1\}^{l_e' + l_H + l_\varnothing}$$

$$r_{v'} \leftarrow \{0,1\}^{l_v + l_H + l_\varnothing}$$

$$\{r_{m_i}\}_{i=1}^k \leftarrow \{0,1\}^{l_m + l_H + l_\varnothing}$$

where $l_H$ is the size of the challenge, $l_\varnothing$ controls statistical zero-knowledge and $l_e' < l_e - l_H - l_\varnothing - 3$ is the bit-length that determines the interval from which $e$ is taken in order to succeed in the proof with interval checks $e - 2^{l_e - 1} \in \{0, 1\}^{l_e' + l_H + l_\varnothing + 2}$. The prover computes a commitment $$t_Z = A'^{r_e} R_1^{r_{m_1}} \cdot \ldots \cdot R_k^{r_{m_k}} S^{r_v}$$

and a challenge $ch = H(n | A' | R_1 | \ldots | R_k | S | Z | t_Z)$. The prover computes responses:

$$s_e = r_e - ch \cdot e'$$

$$s_{v'} = r_{v'} - ch \cdot v'$$

$$\{s_{m_i}\}_{i=1}^k = r_{m_i} - ch \cdot m_i$$

and sends to the verifier $\pi = (A', ch, s_e, s_{v'}, \{s_{m_i}\}_{i=1}^k)$. The verifier computes $$t_Z' = (Z / A'^{2^{l_e - 1}})^{ch} A'^{s_e} R_1^{s_{m_1}} \cdot \ldots \cdot R_k^{s_{m_k}} S^{s_{v'}},$$

verifies if $ch = H(n | A' | R_1 | \ldots | R_k | S | Z | t_Z)$, and runs the interval checks $s_e \in \pm \{0,1\}^{l_e' + l_H + l_\varnothing + 1}$ and $\{s_{m_i}\}_{i=1}^k \in \pm \{0, 1\}^{l_m + l_H + l_\varnothing + 1}$.

Example values for the parameters are $l_H = 256$, $l_\varnothing = 80$ and $l_e' = 120$.

To prove that a message $m_3$ committed to in $$c_{m_3} = g_1^{m_3} h^{open_{m_3}}$$

is the product of two messages $m_1$ and $m_2$ committed to in $$c_{m_3} = g_1^{m_3} h^{open_{m_3}}$$

and $$c_{m_2} = g_1^{m_2} h^{open_{m_2}}$$

respectively, the following proof can be used:

$$NIPK\{(m_1, open_{m_1}, m_2, open_{m_2}, m_3, open_{m_3}, m_2 \cdot open_{m_1}) : c_{m_1} =$$

$$g_1^{m_1} h^{open_{m_1}} \wedge c_{m_2} =$$

$$g_1^{m_2} h^{open_{m_2}} \wedge c_{m_3} = g_1^{m_3} h^{open_{m_3}} \wedge 1 = c_{m_1}^{m_2} (1/g_1)^{m_3} (1/h)^{m_2 \cdot open_{m_1}}\}$$

To prove that a committed value $x$ lies in an interval $[a, b]$, it is shown that $x - a \geq 0$ and $b - x \geq 0$. For example, a non-interactive zero knowledge proof may be used to prove that an integer $m \geq 0$. The proof is based on the fact that any positive integer $m$ of the form $4m + 1$ can be written as a sum of three squares $a^2 + b^2 + d^2$. Therefore, to prove that $m \geq 0$, the method proves that $4m + 1 = a^2 + b^2 + d^2$. Values $(a, b, d)$ may be computed via the Rabin-Shallit algorithm. The proof is:

$$NIPK\{(m, open_m, a, b, d) : C_m = g^m h^{open_m} \wedge 4m + 1 = a^2 + b^2 + d^2\}$$

Figure 9:
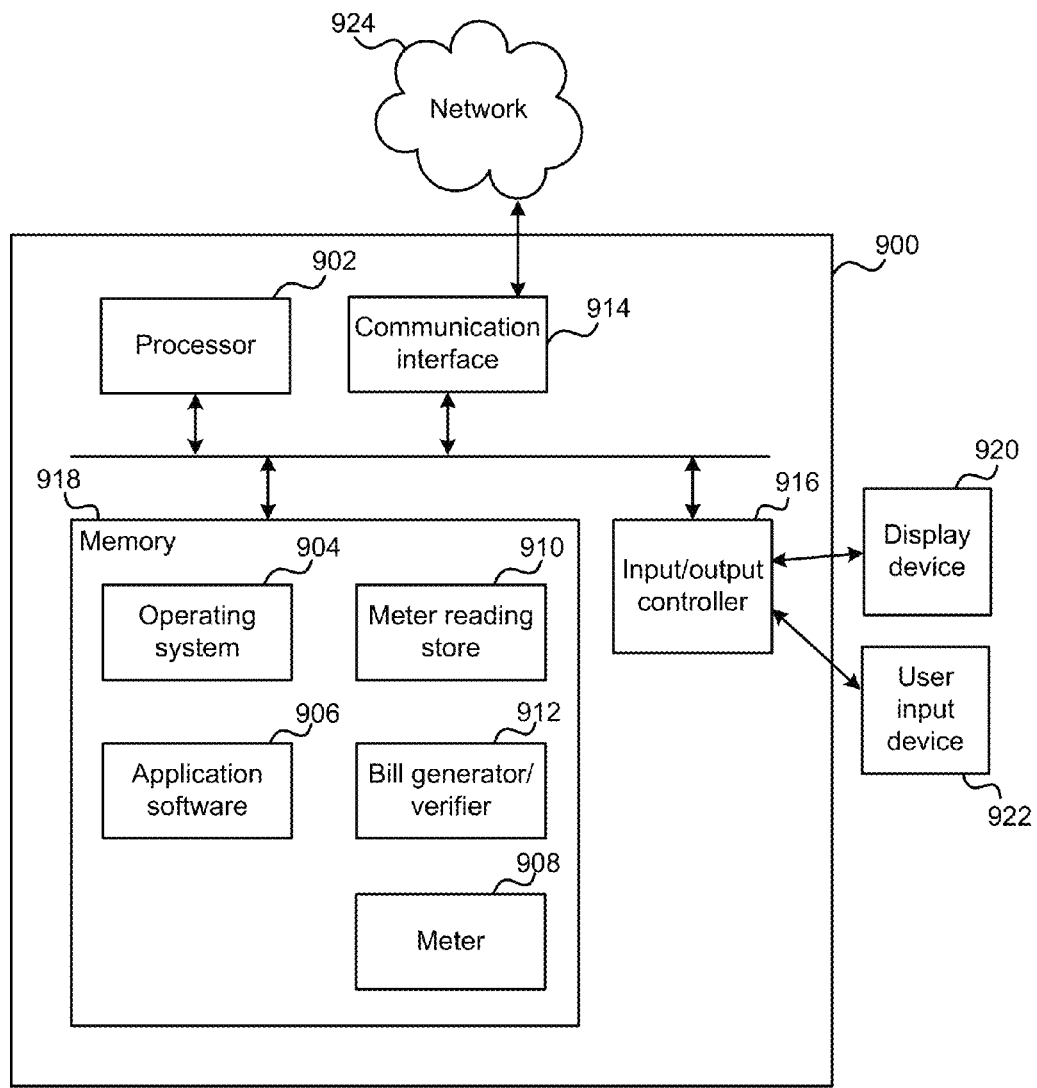
FIG. 9 illustrates an exemplary computing-based device in which embodiments of a smart meter or bill generator or bill verifier may be implemented.

FIG. 9 illustrates various components of an exemplary computing-based device 900 which may be implemented as any form of a computing and/or electronic device, and in which embodiments of an entity in a privacy preserving metering system may be implemented. For example, a meter, a bill generator, or a bill verifier.

Computing-based device 900 comprises one or more processors 902 which may be microprocessors, controllers or any other suitable type of processors for processing computing executable instructions to control the operation of the device in order to provide at least part of a privacy preserving metering system. For example, by providing a meter or a bill generator able to generate a privacy preserving bill and a proof to certify that bill, or a bill verifier able to verify a bill that is provided together with a proof certifying that bill. In some examples, for example where a system on a chip architecture is used, the processors 902 may include one or more fixed function blocks (also referred to as accelerators) which implement a part of the methods described herein in hardware (rather than software or firmware). Platform software comprising an operating system 904 or any other suitable platform software may be provided at the computing-based device to enable application software 906 to be executed on the device.

The computer executable instructions may be provided using any computer-readable media that is accessible by computing based device 900. Computer-readable media may include, for example, computer storage media such as memory 918 and communications media. Computer storage media, such as memory 918, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device. In contrast, communication media may embody computer readable instructions, data structures, program modules, or other data in a modulated data signal, such as a carrier wave, or other transport mechanism. Although the computer storage media (memory 918) is shown within the computing-based device 900 it will be appreciated that the storage may be distributed or located remotely and accessed via a network or other communication link (e.g. using communication interface 914).

The computing based device comprises a communication interface 914 which enables it to communicate with other entities over a communications network 924.

The computing-based device 900 also comprises an input/output controller 916 arranged to output display information to a display device 920 which may be separate from or integral to the computing-based device 900. The display information may provide a graphical user interface. The input/output controller 916 is also arranged to receive and process input from one or more devices, such as a user input device 922 (e.g. a mouse or a keyboard). This user input may be used to control the device in order to generate privacy preserving bills or to verify such bills. In embodiments where the device is a smart meter the user input may be used to control use of a resource being metered by the smart meter. In an embodiment the display device 920 may also act as the user input device 922 if it is a touch sensitive display device. The input/output controller 916 may also output data to devices other than the display device, e.g. a locally connected printing device.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A computer-implemented method at a customer device comprising:
    storing, at the customer device, a customer key shared only with a meter which monitors consumption of a resource by the customer;
    receiving, at the customer device from outside of the customer device, a plurality of encrypted meter readings encrypted using the customer key;

receiving timeslot information associated with the plurality of encrypted meter readings;

receiving computation information;

receiving at least one signature being a signature of a plurality commitments to the meter readings, the signature having been generated by the meter using a pseudorandom string generated from the customer key;

regenerating the plurality of commitments to the meter readings using the customer key;

decrypting the meter readings based on the customer key;

calculating a resource consumption computation using the decrypted meter readings and the computation information, the resource consumption computation omitting the meter readings;

generating a proof of correctness of the resource consumption computation;

sending the resource consumption computation, proof and regenerated commitments to a provider of the resource.

2. The method as claimed in claim 1 which comprises deriving a temporary key from the customer key and decrypting the meter readings using the temporary key.

3. The method as claimed in claim 1 which comprises downloading the encrypted meter readings and signature using a web browser.

4. The method as claimed in claim 1 which is carried out by a web browser.

5. The method as claimed in claim 1 which further comprises calculating statistics of resource consumption behavior by the customer from the decrypted meter readings.

6. The method as claimed in claim 5 comprising making suggestions to the customer for reducing consumption of the resource.

7. A computer-implemented method of verifying a computation for consumption of a resource by a customer comprising:

storing a plurality of encrypted meter readings observed over a consumption period by a meter monitoring consumption of the resource by the customer, the meter storing a customer key used to encrypt the plurality of encrypted meter readings, the plurality of encrypted meter readings being associated with a plurality of timeslots;

storing a cryptographic signature of a plurality of commitments to the meter readings from the meter;

sending the encrypted meter readings and the cryptographic signature to a customer device over a communications network, the customer device storing the customer key, the customer key being shared only between the meter and the customer device;

receiving a resource consumption computation, a proof of the resource consumption computation, and regenerated commitments from the customer device over the communications network;

verifying the resource consumption computation and proof using the regenerated commitments and the stored cryptographic signature without gaining any knowledge of the meter readings.

8. The method as claimed in claim 7 which comprises checking that the cryptographic signature matches the regenerated commitments.

9. The method as claimed in claim 7 which comprises checking that the resource consumption computation and proof were calculated using the correct commitments and computation information.

10. The method as claimed in claim 7 which comprises receiving unencrypted data from the meter.

11. The method as claimed in claim 7 which comprises checking that the encrypted meter readings and cryptographic signature are from the meter.

12. The method as claimed in claim 11 which comprises receiving a hash from the meter, the hash comprising at least a hash of the encrypted meter readings and a hash of the cryptographic signature.

13. The method as claimed in claim 12 comprising checking that the encrypted meter readings and cryptographic signature are from the meter by recalculating the hash and comparing the recalculated hash with the received hash.

14. The method as claimed in claim 7 wherein the proof is a zero knowledge proof.

15. The method as claimed in claim 7 wherein the resource is a utility selected from any of: water, gas, electricity.

16. A method at a meter comprising:

storing, at the meter, meter readings for consumption of a resource by a customer;

storing, at the meter, a customer key shared only with the customer;

encrypting the meter readings using the customer key and sending the encrypted meter readings to a provider of the resource, sending the encrypted meter readings to the provider being part of sending the encrypted meter readings to the customer, the customer having stored the customer key;

computing a plurality of commitments to the meter readings and generating a cryptographic signature of the plurality of commitments using the customer key;

sending the cryptographic signature to the provider;

storing a timeslot as part of each meter reading; and sending the timeslots to the provider of the resource.

17. The method as claimed in claim 16 which comprises deriving a temporary key from the customer key for each meter reading and using the temporary keys to encrypt the meter readings.

18. The method as claimed in claim 16 which comprises deriving a temporary key from the customer key and from one or more other customer keys associated with other meters.

19. The method as claimed in claim 18 comprising using the temporary key to encrypt meter readings of the meter and of the other meters such that the encrypted meter readings may be aggregated.

* * * * *